United States Patent
Gilder et al.

(10) Patent No.: US 7,620,603 B2
(45) Date of Patent: Nov. 17, 2009

(54) SYSTEMS AND METHODS USING PAPERLESS CHECK 21 ITEMS

(75) Inventors: Clark S. Gilder, Alpharetta, GA (US); Michael G. Lalonde, Alpharetta, GA (US)

(73) Assignee: Global Standard Financial, Inc., Alpharetta, GA (US)

( * ) Notice: Subject to any disclaimer, the term of this patent is extended or adjusted under 35 U.S.C. 154(b) by 0 days.

(21) Appl. No.: 12/019,079

(22) Filed: Jan. 24, 2008

(65) Prior Publication Data

US 2009/0094148 A1 Apr. 9, 2009

Related U.S. Application Data

(63) Continuation of application No. 11/868,939, filed on Oct. 8, 2007.

(51) Int. Cl.
G06Q 40/00 (2006.01)
(52) U.S. Cl. ............................. 705/44; 705/39; 705/42
(58) Field of Classification Search ................... 705/44, 705/39, 38
See application file for complete search history.

(56) References Cited

U.S. PATENT DOCUMENTS

| | | | |
|---|---|---|---|
| 5,237,159 A | 8/1993 | Stephens et al. | |
| 5,283,829 A | 2/1994 | Anderson | |
| 5,484,988 A | 1/1996 | Hills et al. | |
| 5,594,225 A | 1/1997 | Botvin | |
| 5,677,955 A | 10/1997 | Doggett et al. | |
| 5,783,808 A | 7/1998 | Josephson | |
| 5,848,400 A | 12/1998 | Chang | |
| 5,884,288 A | 3/1999 | Chang et al. | |
| 5,903,878 A | 5/1999 | Talati et al. | |
| 5,910,988 A | 6/1999 | Ballard | |
| 6,032,137 A | 2/2000 | Ballard | |
| 6,164,528 A | 12/2000 | Hills et al. | |
| 6,283,366 B1 | 9/2001 | Hills et al. | |
| 6,354,491 B2 | 3/2002 | Nichols et al. | |
| 6,411,942 B1 | 6/2002 | Fujimoto | |
| 6,547,129 B2 | 4/2003 | Nichols et al. | |
| 6,789,068 B1 | 9/2004 | Blaze et al. | |
| 6,990,224 B2 | 1/2006 | Warren et al. | |
| 7,089,208 B1 * | 8/2006 | Levchin et al. ................ 705/39 |
| 7,103,579 B1 | 9/2006 | Phillips et al. | |
| 7,113,925 B2 | 9/2006 | Waserstein et al. | |

(Continued)

OTHER PUBLICATIONS

ING Direct, "http://home.ingdirect.com/about/about.asp?s=News06" Archived 2006 News and Press Releases, Apr. 11, May 12, Aug. 11, Nov. 26.*

(Continued)

*Primary Examiner*—Kambiz Abdi
*Assistant Examiner*—Lindsay M. Maguire
(74) *Attorney, Agent, or Firm*—Clements Bernard PLLC; Lawrence A. Baratta, Jr.; Christopher L. Bernard

(57) ABSTRACT

The disclosure describes a digitally originated check (DOC) through an electronic payment system (EPS) which captures payor metadata instructions regarding the intended payment to a payee. The metadata is stored in a database or the like for further processing instead of printing a paper check. The DOC can be cleared either electronically or through a paper substitute check through Check 21 clearing methods.

15 Claims, 10 Drawing Sheets

U.S. PATENT DOCUMENTS

| | | |
|---|---|---|
| 7,131,571 B2 | 11/2006 | Swift et al. |
| 7,175,074 B2 | 2/2007 | Mejias et al. |
| 7,231,068 B2 | 6/2007 | Tibor |
| 2001/0044764 A1 | 11/2001 | Arnold |
| 2002/0065786 A1 | 5/2002 | Martens et al. |
| 2002/0120846 A1 | 8/2002 | Stewart et al. |
| 2003/0046229 A1 | 3/2003 | Cresswell |
| 2003/0083967 A1 | 5/2003 | Fleming |
| 2003/0093368 A1 | 5/2003 | Manfre et al. |
| 2003/0187797 A1 | 10/2003 | Song et al. |
| 2004/0199462 A1 | 10/2004 | Starrs |
| 2004/0236688 A1 | 11/2004 | Bozeman |
| 2005/0161502 A1 | 7/2005 | Smith, Jr. et al. |
| 2006/0045321 A1 | 3/2006 | Yu |
| 2006/0161501 A1 | 7/2006 | Waserstein et al. |
| 2006/0273165 A1 | 12/2006 | Swift et al. |
| 2007/0022053 A1 | 1/2007 | Waserstein et al. |
| 2007/0130063 A1 | 6/2007 | Jindia et al. |
| 2007/0175977 A1 | 8/2007 | Bauer et al. |
| 2007/0194102 A1 | 8/2007 | Cohen |
| 2007/0288380 A1 | 12/2007 | Starrs |

OTHER PUBLICATIONS

Doggett, "Electronic Checks—A Detailed Preview", Journal of Retail Banking Services, Summer 1996, vol. XVIII, No. 2, ABI/INFORM Global.

Murphy, "The Check Is In The Email", Bank Technology News, 12 (9): 49+, Sep. 1999. Copyright 1999 Thomson Media.

wikipedia.org, "Globally Unique Identifier," http://en.wikipedia.org/wiki/GUID.

wikipedia.org, "Personal Identification Number," http://en.wikipedia.org/wiki/Personal_identification_number.

Cocheo, "One-Click check presentment", American Bankers Association, ABA Banking Journal, Nov. 2000, pp. 48,58-62.

* cited by examiner

•003456789•
11/02/2004
1234567890

This is a legal copy of
your check. You can use
it the same way you
would use the original
check.

John or Jane Doe  147
PO Box 123
Home Town, MD 83801    Date: *Oct. 11, 2004*

Pay to: *Fairtime Mortgage Co.*    $ 450.34

*Four Hundred, Fifty, and 34/100* ———— DOLLARS

*Payment 36*    *Jane Doe*

⑈:1000110001/:⑈  ⑈:00001234:⑈  ⑈0147  -000045034-

090909892
Truncate Bank

11222331
Deposit Bank National
Philadelphia
678787878

For Deposit Only
Deposit Bank National
Account 121123456
Fairtime Mortgage Co.

SYSTEMS AND METHODS USING PAPERLESS CHECK 21 ITEMS

CROSS-REFERENCE TO RELATED APPLICATION(S)

This application is a continuation of co-pending U.S. patent application Ser. No. 11/868,939, filed Oct. 8, 2007, and entitled "ENHANCED CHECK 21 FINANCIAL PAYMENT SYSTEMS AND METHODS," the contents of which are incorporated in full by reference herein.

FIELD OF THE INVENTION

The present invention relates generally to systems and methods for paperless Check 21 items, and, more particularly, the present invention provides systems and methods for a paperless Check 21 item that performs as a digitally originated check which is compliant with Check 21 regulations and which can be utilized in digital form from creation to clearing without the requirement to create a paper check.

BACKGROUND OF THE INVENTION

Checks are negotiable instruments regulated in the United States under the Uniform Commercial Code (U.C.C.) Articles 3 and 4. Traditionally, checks are paper instruments created by the payor filling in a pre-printed form on check stock paper where the payor inputs by handwriting, typing, or printing the required payment information. This paper check is then sent out using the mail, overnight delivery, hand delivery, or the like, but in the end the paper check is physically delivered directly to the payee to satisfy a debt. Upon receipt, the payee deposits the paper check into their bank for credit to their own account. The depositing bank bundles all of the paper checks together and sends them to the banks' "Item Processing" department for processing (i.e., sorting, grouping and totaling) by high speed machinery. The purpose of this processing was to generate the necessary accounting entries needed to debit and credit the appropriate checking accounts and clear the payment. If the deposited check originated outside of the bank, the paper check would have to be forwarded for presentment to the originating (or paying) bank for payment.

Traditionally, paper checks moved from the Bank of First Deposit (BOFD) to one or more clearinghouses—either another regional clearinghouse which was closer to the clearing bank (often times a Federal Reserve Bank in the issuing banks geographic area) or directly to the clearing bank. It is the clearing banks responsibility to validate the check, verify the account exists and has sufficient funds and then pay the BOFD so it may credit the account of the depositing payee.

This dependence on the movement of paper (for security, authenticity and processing/payment) created a multi-day processing period between the date of deposit and the date of payment and finally the date of credit to the payee's account. This movement of paper checks was a weakness in the United States financial system as checks have been the preferred method for making payments between individuals, businesses, and the government. Further, the movement of these paper checks frequently utilized the airline network to quickly move paper from one part of the country to another. Thus, when 9/11 struck and the airline fleets were grounded, the entire check clearing and payment system was shut down. This caused paychecks to not be delivered and people were left without funds to pay for necessities. The aftermath of this transportation delay created huge political pressure on the government to eliminate the dependency on paper check clearing.

Prior to the Check 21 Act, a bank that presented a check for payment was required to present the original paper check unless the clearing bank had agreed to accept alternative presentment from the depositing bank in some other form, such as electronic image exchange. §3-501(b)(2) and §4-110 of the Uniform Commercial Code (U.C.C.) specifically authorize banks and other persons to agree to alternative means of presentment, such as electronic image presentment. However, to truncate checks early in the collection process and engage in broad-based electronic presentment, a collecting bank would need electronic presentment agreements with each bank to which it presents checks for collection. This limitation proved impracticable because of both the large number of banks and the unwillingness of some paying banks to receive electronic presentment. As a result of the difficulty in obtaining the agreements necessary to present checks electronically in all cases, prior to the Check 21 Act, banks had not been able to take full advantage of the efficiencies and potential cost savings of handling checks electronically.

The Check Clearing for the 21st Century Act (Check 21) became effective on Oct. 28, 2004. Check 21 was designed to foster innovation in the payments system and to enhance efficiency by reducing some of the legal impediments to check truncation (i.e., eliminating a paper check by converting it into a digital image and destroying the original paper item). The law facilitates check truncation by creating a new negotiable instrument called a substitute check, which permits banks to truncate original paper checks, to process check information electronically via exchange of check image files, and to deliver substitute checks to banks that want to continue receiving paper checks. A substitute check is created from a check image described by the X.9.37 'ANSI' draft standard or the X9.180 final standard, both of which are herein incorporated by reference in-full. This image file is a digital bitmap in Tagged Image File Format (TIFF) format created by electronically scanning and imaging the front and back of the original paper check. The substitute check (also known as an Image Replacement Document (IRD)), is created by printing the front and back images along with some additional information on an 8.5×11 inch sheet of paper. Under the Check 21 law, this IRD is treated as the legal equivalent of the original check and includes all the information contained on the original check. When printed, the images and data must conform to the X9.140 standard, which is herein incorporated by reference in-full. The law does not require banks to accept checks in electronic form nor does it require banks to use the new authority granted by the Act to create substitute checks.

Referring to FIG. 1, a substitute check (or IRD) 10 is a paper reproduction of an original check that contains an image of the front and back of the original check and is suitable for automated processing in the same manner as the original check. To clear a check for consideration of payment, the depositing bank transfers, presents, or returns the substitute check 10 (or another paper or electronic representation of a substitute check, such as an Image Cash Letter file) and warrants that (1) the substitute check 10 contains an accurate image of the front and back of the original check and a legend stating that it is the legal equivalent of the original check, and (2) no depositary bank, drawee, drawer, or endorser will be asked to pay a check that it already has paid. The substitute check 10 for which a bank has made these warranties is the legal equivalent of the original check for all purposes and all persons.

Although Check 21 has facilitated the inter-bank exchange of electronic check images, it has not been fully utilized or enabled throughout the payment system due to a variety of security weaknesses or legal holes that are currently viewed to be either unsolvable or to be extreme business method barriers which would need to be overcome before a wider adoption of Check 21 imaging concepts can be implemented across the payments industry. First, in terms of general Check 21 industry implementation problems, frequently both the actual paper check and the Check 21 image may be cleared by the bank creating a double debit situation. Note that while the actual number of occurrences of these double debits has been reduced as banks improve their internal Check 21 business methods and systems, these same well known debit issues are generally unavoidable for any bank first implementing a Check 21 style image clearing process for either the forward or return clearing cycles. Second, as recognized by check security expert Frank Abignale, a variety of security issues are of grave concern to banks given the fact that after imaging, a check looses the entire set of existing paper security features which have been developed over the last 30 to 40 years. These image security holes show up primarily in the banking industry when they contemplate the concept of having a customer present an image to a bank to be settled as a UCC check payment. Consider for example, the case where a customer shows up with what looks like a Check 21 image in IRD form. As currently viewed by the industry, anyone with a modest degree of skill in digital graphics editing can create a valid, Check 21 like image using PhotoShop or other graphics software programs by using stolen Demand Deposit Account (DDA) data to create a fraudulent check. Also, given the lack of security in paper IRDs, banks are reluctant to accept random IRDs for deposit, slowing down their acceptance as returned items.

Finally, banks do not believe that end users or customers are permitted to generate their own check images under the existing Check 21 act; so from the industry viewpoint, there are legal and regulatory barriers that must be overcome before Check 21 items would be viable consumer originated payment mechanisms. These problems must be overcome before the concepts of Check 21 can be applied to everyone—allowing more users to receive the benefits that are already being received by the banks. The benefits of image origination and processing include faster delivery, lower costs from efficiently processing payments and the reduced clearing time and reduced risk exposure from unknown payor items on out of town banks. Finally, if properly implemented, the concepts provided by the Check 21 act would enable everyone from consumers to businesses to governments to charities to create and effectively process, secure electronic payments in a manner similar to existing low cost electronic payment methods such as Electronic Check Automated Clearinghouse (ACH) items covered under the National Clearinghouse Association (NACHA) rules.

Referring to FIG. 2, conventionally under Check 21, substitute checks or IRDs are only utilized between banks, such as clearing banks, banks of first deposit, and the like. A flowchart 20 illustrates an exemplary embodiment of Check 21 under conventional operation. First, a payor drafts a paper check from their demand deposit account (DDA) bank (step 22). Next, the paper check is physically delivered, such as mailed, hand delivered, etc., to a payee (step 24). The payee manually deposits the paper check into their bank account (step 26). The bank where the payee deposits the check is referred to as a bank of first deposit (BOFD). Once in the BOFD, the paper check is sorted and converted into a substitute checking according to the regulations under Check 21. The BOFD can pay the payee cash, credit the payee's account, or the like (step 30) once the check has been deposited into the payee's account. Also, the BOFD initiates the clearing process with the substitute check through a traditional clearinghouse or an Electronic Payments Clearinghouse (EPCH) or the like (step 32). The clearing process moves the substitute check to a clearing bank, i.e. the bank with the DDA account of the payor, and the clearing bank validates the substitute check, verifies the account exists with sufficient funds, and finally pays the BOFD (step 34). Finally, the clearing bank can use the substitute check image with the payor's monthly statement in lieu of paper checks (step 36).

Of note, the Check 21 Act does not require any bank to use electronic check processing, receive electronic presentment, or create substitute checks based on check images. However, after the effective date of the Check 21 Act, any bank that requires an original check must accept a legally equivalent substitute check in satisfaction of that requirement. As a result, for the most part, banks would not be required to change their check processing equipment or practices because of the Check 21 Act, and there would be no need for a bank to sort original checks and substitute checks separately during the check collection process. Using the substitute check format, banks which choose to use image processing during their check collection and clearing process are allowed to do so while maintaining backwards compatibility with banks which do not have the ability to electronically process image files. For example, in the past a depositary bank in California that receives a check drawn on a bank in New York would transport the original paper check back to New York for payment. Now under Check 21, a substitute check image file can be sent to the New York bank without specific prior contractual agreement or consent by the New York bank to the California bank. Now, if needed, the New York bank (or its agent) can receive the image file and print it in IRD or substitute format and continue to process the re-created paper check using their traditional check clearing process. In summary, Check 21 allows banks that wish to image checks and exchange image files to do so while still allowing some banks to receive compatible paper checks based on Check 21 image files.

Electronic payments and images and the like contain raw data which constitutes the item itself, however there is another form of data called "metadata". Metadata is data about data. An item of metadata may describe an individual datum, or content item, or a collection of data including multiple content items. Metadata is used to facilitate the understanding, use and management of data. The metadata required for effective data management varies with the type of data and context of use. The concept of "generating a bitmap from metadata" is foreign to banks, but common in the computer graphics industry. Thus, those skilled in the art of payments generally do not know how the computer graphics bitmap "rasterization" process works. However, as is known by those skilled in computer graphics, it is often easier and more convenient to generate bitmap images dynamically from metadata. Further, there is no nexus between metadata driven bitmap generation and the payment system, checks, or legal contracts, the UCC and the like. Also it is considered by the present invention, in order to make an electronic check image payment system acceptable to banks, additional security is required to protect banks from accepting fraudulent images (e.g., created by hackers using a graphics program). Given the size and degree of investment that banks have made in paper check imaging equipment, it can be seen by those of average skill that there has been no incentive for banks to pay for the designing and building of new software systems to enable end user created paperless Check 21 items. Additionally, there is little to no existing Public Key Infrastructure (PKI) systems at banks (other than Secure Sockets Layer (SSL) keys for website security) to facilitate end user digital signing of Check 21 images.

Thus, conventional mechanisms in the banking and payment industry include imaging of paper checks. Check 21 law only allows banks to truncate paper checks to create Check 21 items. The features of Remote (electronic) Deposit (RD) are currently available to businesses who receive paper checks. RD based systems allow the business, as a payee, to scan paper checks and remotely deposit them into their bank; but traditionally these items are cleared through an Automated Clearing House (ACH) agreement as POP or ARC ACH items, not as UCC check items. Thus, no conventional mechanism exists to allow UCC based electronic checks to flow through the entire check payment system without reduction to paper at some point or conversion into another payment type. Existing ACH "electronic check" prior art does not solve these problems as these all disclose a paper check in one form or another in the process. Further, these ACH "electronic" checks do not comply with ANSI X9 standards.

BRIEF SUMMARY OF THE INVENTION

In various exemplary embodiments, the present invention provides enhanced processing of Check 21 items using a digitally originated check (DOC) processed through an electronic payment system (EPS) which captures payor metadata instructions regarding the intended payment to a payee. The metadata is stored in a database or the like for further processing instead of printing a paper check.

In an exemplary embodiment, a paperless check method includes (a) receiving an acceptance from a payor of a set of warranties and indemnities applicable to banks of first deposit and clearing banks, wherein the set of warranties and indemnities extend Check 21 regulations between the payor and a payee and through the banks of first deposit and clearing banks, and wherein the set of warranties and indemnities enables the payor to provide a digitally originated check to a payee; (b) receiving a payment instruction from the payor to the payee, wherein the payment instruction is subject to the set of warranties and indemnities; (c) capturing metadata associated with the digitally originated check, wherein the digitally originated check is created by the payor without an original paper check, and wherein the metadata includes the payment instruction, a globally unique identifier, tracking information, and security information; and (d) performing one or more of immediately notifying the payee of the digitally originated check and notifying the payee of the digitally originated check at a later time; wherein an output from the metadata is interoperable with both paper and electronic clearing methods associated with Check 21 clearing systems.

The paperless check method can further include (e) authenticating the payee; (f) receiving an acceptance from the payee of the set of warranties and indemnities; and (g) performing one of electronically forwarding the metadata to a bank of first deposit as an electronic Cash Letter File compliant to X9.180 and printing a substitute check compliant to X9.140 from the metadata. The security information is operable to prevent tampering with the payment instructions and the substitute check. The paperless check method can further include (h) electronically endorsing the digitally originated check. The payment instructions include any of conditions, limitations, restrictions, conditional acknowledgements including business rules governing payment terms, and combinations thereof. The tracking information is operable to provide an audit history of the digitally originated check. The security information includes a personal identification number defined by the payor for secure retrieval by the payee.

In another exemplary embodiment, a paperless check system includes (a) data storage comprising a metadata file, wherein the metadata file is associated with a digitally originated check, wherein the digitally originated check is created by a payor without an original paper check, and wherein the metadata file comprises a payment instruction, a globally unique identifier, tracking information, and security information; (b) a network interface connected to the data storage; (c) a processor connected to the network interface and the data storage, wherein the processor is configured to: (i) receive acceptance of a set of warranties and indemnities from the payor; (ii) receive payment instructions from the payor; (iii) create the metadata file with the payment instruction from the payor; (iv) generate and assign the globally unique identifier to the metadata file; (v) notify a payee of the metadata file associated with the digitally originated check; (vi) track the digitally originated check and update the metadata file with an audit history of the digitally originated check; and (vii) authenticate the digitally originated check; wherein the set of warranties and indemnities extend Check 21 regulations between payor and payee and through associated banks of first deposit and clearing banks, and wherein the set of warranties and indemnities enables the payor to provide a digitally originated check to a payee; and wherein an output the metadata file is interoperable with both paper and electronic clearing methods associated with Check 21 clearing systems. Optionally, the processor is further configured to: (viii) authenticate the payee associated with the metadata file; (ix) receive acceptance of the set of warranties and indemnities from the payee; and (x) perform one of electronically forwarding the metadata file to a bank of first deposit as an electronic Cash Letter File compliant to X9.180 and printing a substitute check compliant to X9.140 from the metadata file.

BRIEF DESCRIPTION OF THE DRAWINGS

The present invention is illustrated and described herein with reference to the various drawings, in which like reference numbers denote like method steps and/or system components, respectively, and in which:

FIG. 1 is an illustration of a substitute check (or IRD);

DETAILED DESCRIPTION OF THE INVENTION

Figure 2:
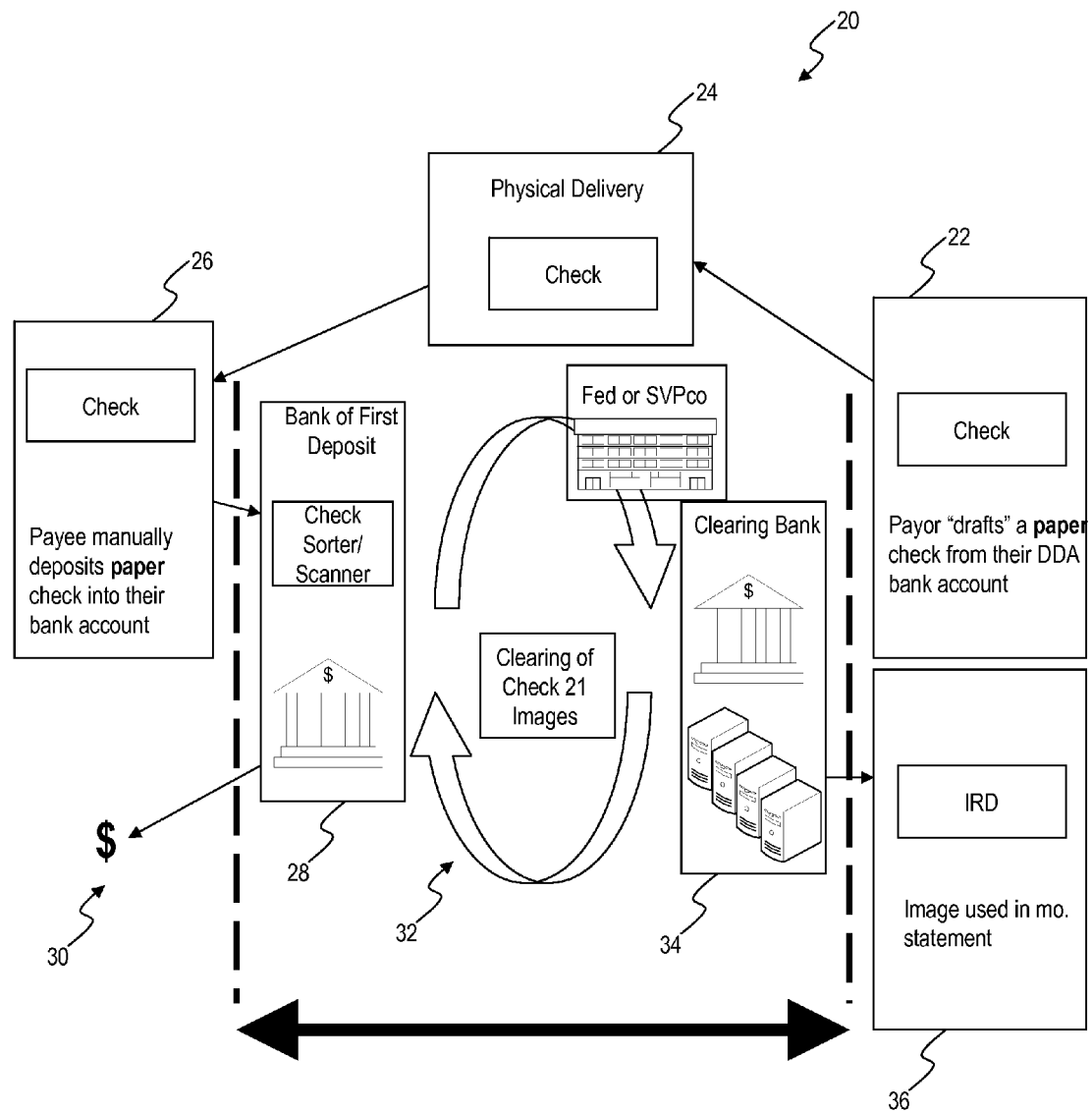
FIG. 2 is a flowchart illustrating the flow of checks and substitute checks conventionally under Check 21.

In various exemplary embodiments, the present invention provides a mechanism to generate and process digitally originated Check 21 items. These items can be described as digitally originated checks (DOC) processed using an electronic payment system (EPS) which captures payor "metadata" which are instructions regarding the intended payment from a payor to a payee. The metadata is stored in a database or the like for further processing instead of printing a paper check. The type of data captured can include traditional information stored on the front of a paper check, such as instructions for "whom to pay" (payee name, phone number or email address), some value amount (input as a decimal number of some currency), the payment issue date, the bank account number from which the payment is to be drafted (traditional checking account number and ABA bank routing number), along with some potential set of conditions, limitations, or restrictions, along with memo field description details, and potentially some type of conditional acknowledgements which are defined to be business rules governing how and when the payment should be made (i.e., putting a contract on the back of a check, thus cashing the check is endorsing the contract).

These payment instructions or "metadata" can be captured or generated in a variety of ways or methods implemented by the electronic payment system (i.e. an EPS can have multiple input forms). For example, a human user can use a variety of system interface choices including an Internet webpage to input the required metadata to generate the DOC payment. Alternatively, a telephony device (cell phone, land line, via an IVR call center system, etc.) or an Internet browsing enabled mobile device (PDA) could be used to login and generate the payment. Additionally, the metadata could be generated by a user using a home or office PC software application such as Intuit's Quicken, Microsoft Money, or other accounting software programs. Also, the present invention contemplates the option of having no human user intervention by supporting generation of DOCs via an automated software program. This software program could generate pre-scheduled DOC payments with information stored in a payment database to send the resulting DOC files directly into the banking system for payroll or automated accounts payable type business scenarios.

In order to provide paperless Check 21 items, the present invention utilizes several elements. First, a framework of knowledge and understanding of the Check 21 law and Check 21 standards, such as X9.37, 140 and 180, which are herein incorporated by reference in-full, are utilized to enable paperless Check 21 items. Additionally, knowledge and understanding of the payments industry including Item Processing, UCC law, Electronic Funds Transfer (EFT) law, and how the "gaps" between Check 21, UCC, and EFT law can be filled. Of note, the present invention utilizes a contractual relationship between a payee and payor to extend Check 21 warranties throughout the system for DOCs. These warranties enable electronic presentment from payees and payors despite the conventional belief that paper checks are required. §3-501(b)(2) and §4-110 of the Uniform Commercial Code (U.C.C.) specifically authorize banks and other persons to agree to alternative means of presentment, such as electronic image presentment. The present invention leverages these concepts to provide a UCC compliant, secure, and Check 21 compliant item in the form of the DOC.

Additionally, the present invention utilizes a wide range of knowledge and skills, across a range of industries outside of banking including a deep understanding of how bitmap graphics are generated in applications such as GUI operating systems, fonts and graphics drivers for video cards, how websites work, as well as how to capture data and store and manage that data as file input into other business processes (i.e. clearinghouses). Further, the present invention includes knowledge and understanding of security concepts: PKI and Certificate Authority (CAs), cryptography, steganography, SSL, digital signatures using public and private keys, secure hashes and the like. The present invention leverages knowledge and understanding of how to solve the weakness inherent in images produced by existing bank Item Processing check sorting machines, including image skew, and errors in Optical Character Recognition (OCR) and Image Quality Assessment (IQA) testing. Also, the present invention includes knowledge and experience with advanced software design and architectures, programming languages, character encoding (ASCII vs. EBCDIC) in electronic file formats, Unicode, internationalization, and database design including SQL language.

Of note, the following ANSI X9 standards apply to check design and security: TR-2 Understanding and Designing Checks, TG-6 Quality Control of MICR Documents, TG-8 Check Security Guideline, X9.7 Bank Check Background and Numerical Convenience Amount Field, X9.100-10 Paper Specifications for Checks (formerly X9.18), X9.100-111 Specifications for Check Endorsements (formerly X9.53), X9.100-130 Specifications for Universal Interbank Batch/Bundle (formerly X9.64), X9.100-151 Check Correction Strip Specification (formerly X9.40), X9.100-160-1 Placement and Location of Magnetic Ink Printing (MICR) (formerly X9.13), X9.100-160-2 Placement and Location of Magnetic Ink Printing (MICR) Part 2: EPC Field Use (formerly X9.13 Annex A only), X9.100-161 Creating MICR Document Specification Forms (formerly X9.47), X9.100-120 Specifications for Bank Deposit Tickets (formerly X9.33), X9.100-170 Specifications for the Padlock Icon (formerly X9.51), X9.100-20 Print and Test Specifications for Magnetic Ink Printing (formerly X9.27), TR-33-2006 Check Image Quality Assurance Standards and Processes, and each of the which are incorporated in-full by reference herein.

Advantageously, the present invention allows payors and payees to utilize paperless Check 21 items, i.e. DOCs, through the banking system without ever reducing it to a paper medium. This allows the use of the check payment system in place of debit cards, ACH transfers, credit cards, and the like. The present invention includes mechanisms to enable substitute checks or electronic metadata files to be utilized by payors and payees without requiring paper checks. The key enablers to open the check payment system to paperless items include a contractual framework between payor and payee authorizing the DOC to comply with indemnities and warranties associated with paper checks, security involving PKI for secure digital payments, and generating computer bitmap graphics from metadata which fully comply with all ANSI X9 standards to ensure full compatibility with the Check 21 Act.

The present invention provides enhanced mechanisms for check payments involving enhanced security, optional or conditional processing, enhanced tracking and processing along with the availability of a "True Check Card" or TCC. A TCC is defined to be a plastic credit card having a second, specialized ISO standard magnetic stripe to issue a digitally originated check (DOC) through an electronic payment system (EPS) to the merchant or business for payment. The merchants Point of Sale (POS) terminal includes a standard credit card authorization terminal where the DOC card would be swiped. Once swiped, the True Check Card provides payor metadata that is merged into the payee information including the transaction amount and merchant ID which is combined at the EPS to generate a DOC payment to the merchant as payee. Thus the combination of the information encoded on the Check Card's magnetic swipe combined with payee metadata provided by the merchant's terminal device provides the detail required to issue a DOC at the EPS. The metadata is stored in a database or the like for further processing instead of printing a paper check.

Figure 3:
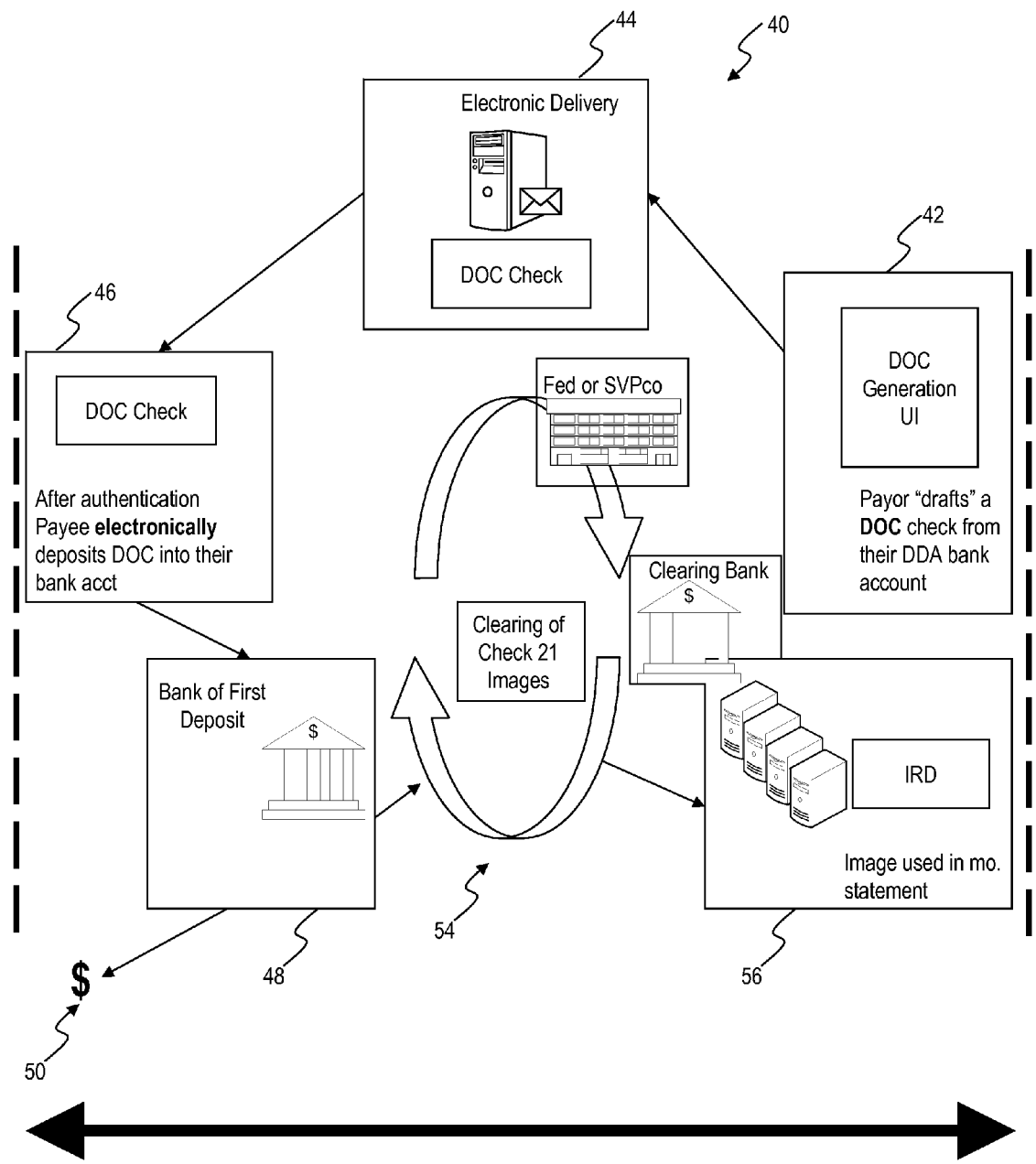
FIG. 3 is a flowchart illustrating the flow of checks, substitute checks, true check card payments, and the like, according to an exemplary embodiment of the present invention.

Referring to FIG. 3, in an exemplary embodiment of the present invention, a DOC is processed electronically throughout a banking system 40. First, a payor 'drafts' a DOC check from their DDA bank account by swiping a true check card (step 42) through a standard POS card swipe terminal. The DOC is created through an EPS, and the DOC is a valid UCC draft in electronic form under the Check 21 X9 standards. The DOC is created with user initiated instructions to pay someone (i.e. a payee), some value amount, under a set of conditions, limitations, restrictions, acknowledgements, and the like. These instructions are stored in a database—e.g. a Digital Payment File (DPF). These digital instructions are used to create a perfect digital check, and there is no paper check required to create these instructions and there is no paper origination or scanning. Additionally, the DOC can be created by "swiping" a true check card (TCC) which electronically generates the DOC at a point-of-sale (POS).

Delivery of the DOC to the payee is electronic (step 44), and the payee is notified. This notification mechanism can take a variety of forms of messaging from the EPS such as an email message (e.g., with an embedded URL with transaction ID to automate the retrieval of the DOC, an embedded file, and the like), a phone call, a pager message, a fax message, an Instant Message (IM), or the like. Once the payee has responded to the EPS notification message, the payee uses a unique transaction identification known as a Globally Unique Identifier (GUID) which was provided to them in the notification message to identify which specific DOC to retrieve. The GUID is a special type of identifier used in software applications in order to provide a reference number which is unique in the context for which it is used, for example, in defining the internal reference for a type of access point in a software application, or for creating unique keys in a database. In the present invention, the GUID is sufficiently large to avoid object collisions, i.e. duplicate numbers, and it utilizes an algorithm to ensure GUIDs cannot be spoofed.

The EPS can use the GUID to lookup the DOC transaction and determine how to authenticate the payee based on the authentication level chosen by the payor when sending the DOC (or setup by the payee as a condition for retrieving payments from the EPS under a specific name or ID). Authentication levels can include, none (i.e., just knowing the transaction ID or GUID is enough security for the payor), a unique PIN number for each DOC (e.g., PIN is sent separately by the payor, i.e. a phone call, or if sent via the EPS it is sent separately from the notification message), additional levels of credentials (e.g., unique account number and login ID into the EPS), private digital security signature key (e.g., using a public key cryptography system), or other level of security mechanism agreed to by one or both parties and supported by the EPS.

After satisfying the authentication and security tests, the payee electronically retrieves a Check 21 image of the payment and verifies that the payment information is correct. After retrieval of an image and verification, the payee can choose the method of depositing the DOC into her bank account (step 46). The present invention provides the payee with multiple choices for depositing or clearing the payment. For example, the payee can retrieve a DPF record for the specific DOC (using the GUID), and the EPS can generate a DOC image (in Check 21 image format) and display it allowing the payee to confirm payment, correct amount, etc. After reviewing the DOC, such as through the EPS, the payee has a choice in how to proceed with claiming their payment. First, the payee can choose to physically print the DOC as an IRD onto paper using a printer, and physically depositing it at the bank like a traditional paper check, i.e. using X9.140 clearing methods. Further, the payee can have the EPS forward the DOC electronically into their bank as an Image Cash Letter (ICL) exchange for deposit saving the time and effort of a trip to the bank, i.e. using X9.180 clearing methods. For example, the forward deposit can use email to send the ICL to a known bank address, such as deposits@bankxyz.com, where the bank's computer system, utilizing a system provided by an EPS hardware appliance, can remove the attached ICL file and automatically forward it to the bank's internal item processing system to allow for crediting of the deposited item. Also, the EPS can convert the DOC into another form of payment, such as Automatic Clearing House (ACH) item and the like.

The BOFD (step 48) provides the payee credit for the DOC (step 50) and clears the DOC through the normal clearinghouse process (step 54). As the DOC payment is processed or "cleared" by the banking system 40, the individual DOC file can subsequently be placed into a standard bank clearinghouse Cash Letter File (X9.180 standard) "bundle" along with other check items (i.e., digitally created or paper scanned images) and exchanged electronically with other banks. Currently, all of the traditional as well as image exchange clearinghouse mechanisms support Check 21 image file exchanges including the Federal Reserve System, ViewPointe, SVPco/The New York Clearinghouse and other Electronic Payments Clearinghouses (EPCH) and the like. Additionally, X9.37 type image files are used as the "accepted format" in many private two party (bank to bank) image exchange agreements. For example, banks, such as Wachovia and Bank of America, can exchange image files directly with each other under private clearing agreements in the X9.37 format. Finally, the DOC clears through the clearing bank, the clearing bank transfers the funds to the BOFD, and the clearing bank uses the DOC image in the payor's monthly statement (step 56).

Figure 4:
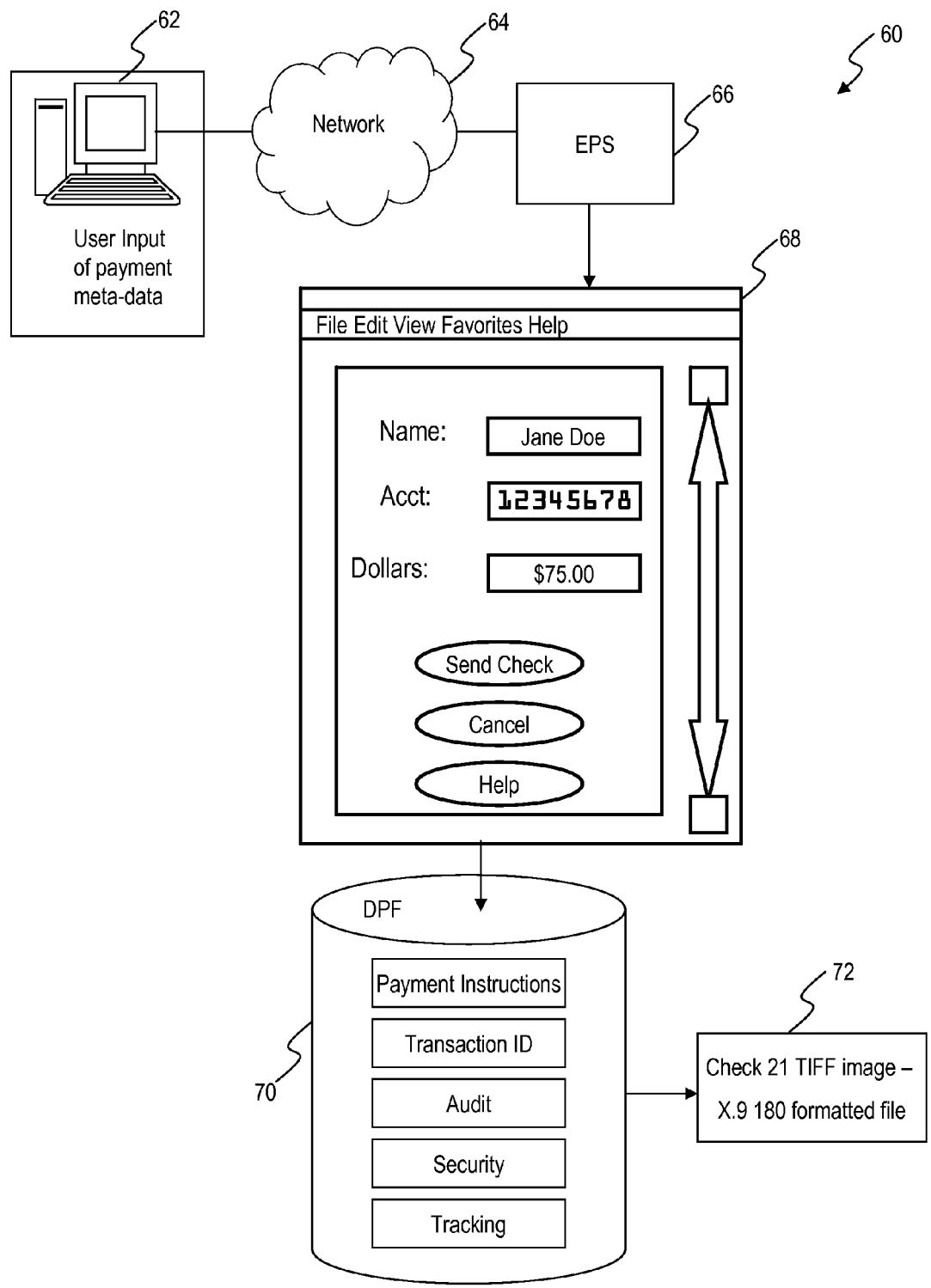
FIG. 4 is a flowchart illustrating DOC generation according to an exemplary embodiment of the present invention.

Referring to FIG. 4, an exemplary embodiment of DOC generation 60 is illustrated. In this exemplary embodiment, the DOC generation 60 utilizes a computer 62 connected through a network 64 (e.g., the Internet, cell phone network, wireless network, etc.) to an EPS 66. The EPS 66 is an electronic system configured to interact with a plurality of users (i.e. payors and payees), banks, and other financial institution to enable DOC generation, distribution, tracking, authentication, security, clearing, and the like. The EPS is designed for high volume, highly reliable payment issuance, tracking and security. For example, the EPS 66 can include a redundant set of bank or clearinghouse payment network interconnections for switching or routing payments as well as redundant data networks along with redundant computer clusters with data storage connected to the Internet.

The EPS 66 is configured to provide a variety of user interface (UI) 68 methods for DOC generation 60. The UI 68 enables a user to open an account, which stores the static payor payment information such as an American Bankers Association (ABA) routing number and account number, as well as separate UI forms for individual DOC creation or for scheduled automatic DOC creation and transmission, or for "one time" payment use. For example, the UI 68 can include input fields for traditional information stored on the front of a paper check, such as instructions for "whom to pay" (e.g., payee name, phone number, email address, physical address, and the like), value amount (e.g., input as a decimal number of some currency), the payment issue date, the bank account number from which the payment is to be drafted (i.e., traditional checking account number and ABA bank routing number). Additionally, the UI 68 can include a memo field describing the payment details, and potentially some level of security requirement such as a PIN number required to retrieve the specific DOC payment. Once the user inputs the data into the UI 68, the EPS 66 generates metadata from the input. Note, the present invention contemplates other mechanisms for generating the metadata, such as automatic processing, swiping a check card, and the like.

Regardless of the mechanism of generating the metadata instructions, the resulting data values are stored in a database record that is called a Digital Payment File (DPF) 70. The DPF 70 includes data in addition to the payment instructions, including a unique transaction ID along with other audit, security and tracking data needed for subsequent data processing of the specified payment. The DPF 70 also uniquely serves as an automatic payor "positive pay" file record to control clearing. Additionally, the present invention can produce images 72 in the exact bitmap form and format required by the X9 specifications (X9.37 draft as well as X9.140 IRD final and X9.180 image & cash letter format).

Note that paperless Check 21 items or DOCs are compatible with the Check 21 standard and are built using two key parts—first, the DPF 70 which contains computer instructions and resulting "metadata" which is used, when required, to create the second part, which is the computer generated "bitmap" image 72 of the front and back of a bank check along with additional data stored in a Check 21 Cash Letter record and bundle. The computer generation of the bitmap is called the "digital origination" step to distinguish it from the traditional scanning of a paper check which could be called manual or "paper origination" of a check image. The DOC image file compatibly displays the check information such as payment amount, account number and payee name (along with other embedded metadata if required) on the front image of the check using a standard Check 21 X9 TIFF image format. Note that due to the unique "digital origination" (i.e. non-paper based origination), a DOC has several opportunities to facilitate or provide unique processing options to payors, payees, banks and third parties involved in the payment process. First, because DOCs are valid Check 21 items, they can be truncated into ACH items or converted into other payment forms such as credit or debit transactions. Second, DOCs can include valuable business options such as conditional payment given fulfillment of a contract, contract enforcement via escrow, limited "shelf life" controlling issuance, acceptance and clearing along with alternative delivery methods. Third, DOCs can have enhanced security on them including PIN numbers per DOC, secure digital signatures, along with barcodes and automated clearing methods. Fourth, because DOCs are dynamically generated from payment metadata stored at the EPS, they can be updated in real time throughout the clearing process to add additional, readable and legible information to the Check 21 image In another exemplary embodiment of the present invention, the DOC metadata which is stored in the DOC DPF 70 can be used to convert the UCC item into alternative payment methods. These alternative ways which do not relate to a check, include methods such as generating an ACH item, a credit card, a debit or ATM item, a wire transfer or some other yet to be developed payment mechanism. The DPF 70 entry is signified when the output of a DOC file is used for purposes other than creating a DOC. The DPF 70 record stores the "instructions to pay" that are used to create another payment form (other than check/DOC). The DPF 70 is an intermediate step to creating an ACH transaction (for example), after a payor creates a DPF record, the payee may choose to process the item as an ACH deposit, resulting in the creation of an ACH file under NACHA rules for clearing under that network. Or, alternatively, the DPF 70 record may be used to generate an ATM network message to facilitate payee cash withdrawal at an ATM machine using the same DPF metadata information.

Another exemplary embodiment of the present invention demonstrates the dynamic image generation nature of DOCs which can facilitate a set of enhanced "back of the check" automation features. This can be easily seen starting first at origination time, when the back of the check image contains no data (it has a blank back of check image), but subsequent processing of the DOC can generate payee metadata used to update the back of the check image. For example, the EPS 66 can also include UI 68 screens for subsequent processing by the payee. Thus, after payee acceptance of the DOC, the EPS can generate Check 21 images that have been "franked" or stamped on the back with legends such as "For Deposit Only", "Account number 12345 at Bank XYZ", "Agreed and Accepted" and even multiple or subsequent payee endorsements—all of which could appear separately or together in a coordinated manner on the back of check image. Another example includes the contractual restrictions (such as agreement to a contract if the check is deposited) that are required by certain business processes or agreements. Each stamped image is generated as a separate image layer from metadata stored in the DPF at the EPS which can be optionally or conditionally produced to generate the final check image format used in settlement. This is a significant improvement over the present systems where human or automated machines "stamp" over top of each other, making the final cleared image unreadable at times. The legibility and readability of the back of a check can become a major focus of attention during any dispute or litigation surrounding the payment settlement process—including who handled the check, at what time, with what endorsements or stamps. These are all areas that are easily handled by the EPS by generating a series of images representing the back of the check state at various points in time without images overlapping each other. Thus payment disputes are avoided or easily settled.

Figure 5:
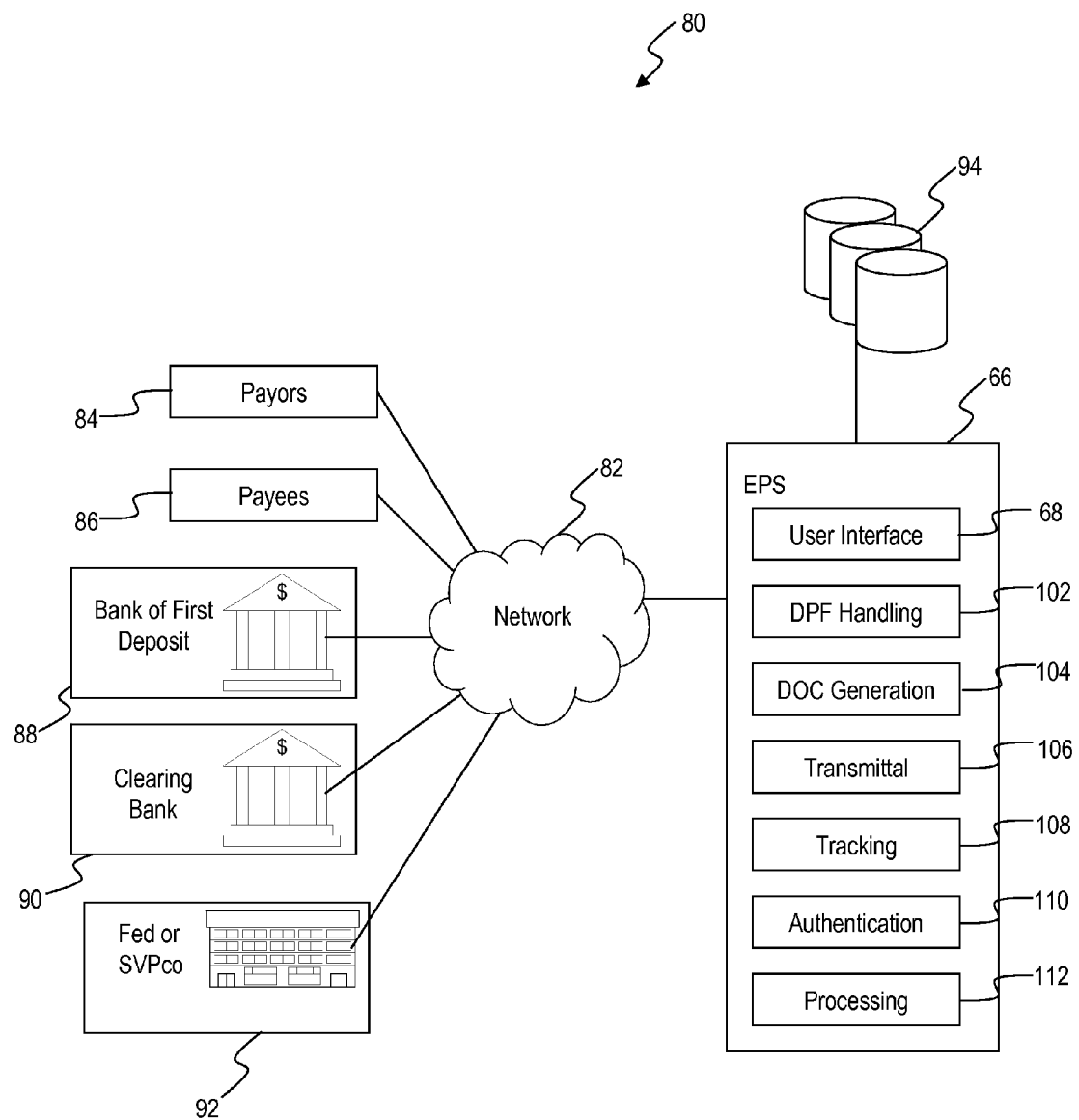
FIG. 5 is a block diagram of an EPS system according to an exemplary embodiment of the present invention.

Referring to FIG. 5, an EPS system 80 is illustrated according to an exemplary embodiment of the present invention. As described herein, the EPS 66 is an electronic system configured to interact with a plurality of users (i.e. payors and payees), banks, and other financial institution to enable DOC generation, distribution, tracking, authentication, security, clearing, and the like. The EPS 66 is configured to communicate over a network 82 to a plurality of payors 84, payees, 86, BOFDs 88, clearing banks 90, clearinghouses 92, and the like. Of note, the present invention allows any payor to create a paperless Check 21 item utilizing the EPS 80. This provides an anyone-to-anyone or peer to peer (P2P) electronic payment system.

Generally, the EPS 66 is a computer system which can include multiple processing elements, distributed memory, network interfaces, external data storage 94, and the like. The EPS 66 is configured with processing and data storage redundancy, and is configured to communicate to the plurality of payors 84, payees, 86, BOFDs 88, clearing banks 90, clearinghouses 92, and the like. The EPS 66 includes various modules, such as the UI 68, DPF handling 102, DOC generation 104, transmittal module 106, tracking module 108, authentication module 110, and processing module 112. As described in FIG. 4, the UI 66 provides a mechanism for users 84, 86, 88, 90, 92 to create and distribute DOCs. Further, the UI 66 can provide mechanisms for tracking, modification, clearing, processing, security, authentication, depositing, reissuing, and the like with regards to DOCs. Also, the EPS 66 can include mechanisms for automating these processes without the need for direct UI 66 access, such as with automated processing.

The DPF handling 102 module is configured to create, modify, update, etc. DPF records associated with specific DOCs. As described herein in FIG. 4, the DPF is a database record storing the metadata instructions related to the DOC. The EPS 66 is configured to store multiple DPFs in the data storage 94 or the like, and to enable the plurality of payees 84, payors 86, BOFDs 88, clearing banks 90, and clearinghouses 92 to create, transmit, receive, and process the DPFs. The DPF handling 102 module is configured to create DOCs responsive to user input or through automated processing. Also, the DPF handling 102 module manages tracking features, audit features, and the like described further herein. For example, because the DOC is based on metadata, it can be modified after issuance, but before final payment. This can be used for amount corrections, typing errors, and the like, when the DOC is still en-route, but not yet deposited. Similarly, the DOC can be re-issued to another party before depositing by the payee. For example, even though a payor has issued the check to one payee, the receiving party (i.e., the payee) can have the check endorsed over or reissued to another payee.

The DOC generation 104 module is further configured to physically print DOCs in IRD format or as normal paper checks as remotely created checks. Further, DOCs in IRD format can automatically be regenerated back into digital form without scanning the IRD paper images utilizing the transaction ID and the EPS. Unlike traditional paper check items which are scanned and then printed in IRD format, the DOC can be re-converted back into digital form at any future date by using the unique transaction identifier (GUID). Note that the DOC check front or back image can be generated in many resolution levels (measured as dots per inch or dpi) which are independent of the chosen bitmap format, such as JPEG, TIFF, PNG, or the like. Second, a DOC image can include optional items which inform and instruct the payee as well as the depositing or clearing bank about the specific payment. Examples of this include merging a "human digitized signature" as the authorized signature directly into the front or back image of the check, even though the paperless Check 21 item was never printed or physically signed (this is accomplished under the e-signature laws using an optional and independent image layer integrated into the Check 21 image) including the statement of "Signature on File". Note that a true, personalized "digitized signature" feature is enabled when the payor or payee has uploaded samples of their human signature or other handwriting samples (e.g., "John Q Public" as their authorized signature) into the EPS. Alternatively, the payor or payee could choose to use a font that displays in "handwriting" format to simulate their human signature. Any of these methods could satisfy the e-signature law as their authorized legal signature. Thus, the dynamic image form of a DOC file can contain valuable, optional data in both machine and human readable form without requiring paper processing. This feature further automates the processing and handling of checks and speeds up the overall business process between payor, payee and the banking system.

Of note, present invention preserves legal rights either created or destroyed during the Check 21 truncation process. Traditionally, Check 21 items are imaged from paper checks which have full rights and responsibilities utilized during the clearing process which are derived from either UCC case law or by the Check 21 act itself (which references UCC law). Note that as passed, the Check 21 act only allows a bank to truncate the check and create a Check 21 item. Comparatively, while the DOC can be transmitted electronically, they can also be used to generate the Check 21 standard "substitute check" or IRD utilizing the X9.140 standard which results in a paper version of the original digital check. The IRD can be printed by the payee and taken into their bank for deposit because it contains a full set of warranties and indemnities. These full set of warranties and indemnities are based on a contract agreed to by both the payor and the payee which the EPS 66 required to be signed in order for the DOC to sent or received. Because DOCs are covered under this contract, they have a full set warranties and indemnities that are acceptable to BOFDs 88 and downstream clearing banks. This novel DOC feature, i.e. DOCs possessing a "full warranty" state, differs from other attempts by either businesses or individual consumer users who want to print their own IRD documents and deposit them at a bank because those documents will not be accepted by the BOFD 88 due to the depositing bank's inability to take on un-transferable risk from an unknown originator of the IRD. This scenario is contemplated where an individual or business does not have an existing two-party private warranty contract with their bank which is a concept allowed for under existing UCC law. Also, under the Check 21 regulation as it exists today only banks can truncate checks by imaging them and later extend their warranties to subsequent clearing banks in either electronic or IRD form.

Thus, the present invention eliminates this risk by using a contract which binds the payor and payee to honor the check image or IRD and allow the bank of deposit and subsequent banks to transfer warranties and liabilities back to the responsible parties. That is, the present invention allows a bank of deposit to transfer risk back to the depositor (or the EPS 66 if it chooses to take on that risk) and if necessary all the way back to the original payor even though the payment was made in image or IRD form. The EPS system 80 facilitates this risk transference via the unique tracking identifier (GUID) and internal audit and tracking procedures along with enhanced security features all of which are bundled together in the delivery of the EPS 66 when generating and retrieving a DOC payment. Thus, the EPS system 80 can effectively measure and track their risk and know who is receiving and forwarding these payments and thus responsibly transfer this risk back to the offending party in the event of a dispute or fraudulent situation.

The notification and transmittal module 106 is configured to handle transmission of DPFs between the various payees 84, payors 86, BOFDs 88, clearing banks 90, and clearinghouses 92. As described herein, each DOC includes a GUID as a unique transaction ID associated with each DPF record. With the present invention, a bank teller could verify the legitimacy of the DOC by inputting into the EPS 66 through the various UI 68 methods (e.g., a webpage, an automated software program or phone IVR system and the like) the digits from the unique transaction identifier (GUID) which can be found on the IRD. This GUID input system is linked to the EPS 66 that originally generated the DOC for the payor, and which allowed the payee to print the IRD in the first place. The GUID value can be printed and found on the front of the IRD in the Check 21 "optional data field" location where it was placed during the DOC IRD generation process. The EPS system could check the GUID as input by the teller to acknowledge that a single, valid IRD was available for deposit (blocking attempts by unscrupulous payees to print and then deposit multiple IRDs) or consequently warning the teller not to accept the IRD because it was either an invalid GUID (for fraudulently self-created IRDs) or if the payment has already been deposited or verified.

The present invention utilizes a unique multi-part processing mechanism taking advantage the electronic nature of the DOC. First, when a payor sends a DOC, the EPS 66 performs multiple dynamic activities unlike the generation of either a paper check or a Check 21 item from a paper check. First, it stores the instructions to pay, and then optionally it can verify the funds are on deposit utilizing a "memo post" or ATM style verification of funds message. Second, the EPS 66 can, at the appointed time, notify the payee that they have a check waiting for them (optionally, payees who are well known to the EPS or who are high volume receivers can have automated depositing linked to payment receipt). The notification concept is similar to getting a phone call from the bank saying that you have a check waiting for deposit. The payee can be notified by email, a voicemail, an SMS text message, an instant message or IM, a traditional pager message, or a FAX and various other notification methods and the like. Regardless of delivery mechanism, the payee is notified with a message to the effect that "you have money". Third, optional business methods can be applied to the delivery and payment presentment which govern or control how the payment is to be made or received. Finally, the payee can utilize the notification method to retrieve the DOC item by utilizing the GUID to identify the specific payment waiting for them. Thus, paying by DOC provides both the notification of the payment event as well as the ability to transfer the payment value in a single or multiple step process or in a manual or automated manner. This invention is unlike paper checks where two steps are mandatory (i.e., creating the value in the check, and then delivering it); the present invention can perform both in one step or with optional enhancements along the process.

Using the transmittal module 106, the teller at the BOFD 88 can request that the specific Check 21 item be re-generated as an electronic image file and be sent back into the BOFD 88 for further processing by the "Item Processing" department. To accomplish this regeneration, the EPS 66 can use the teller supplied GUID value to lookup and retrieve the specific DOC metadata information that was stored in the DPF system. As these re-creation requests arrive at the DPF, the original metadata values (or the currently stored values) are retrieved from the EPS 66 and used to re-create the digital check file in X9 format for further image exchange processing. This electronic X9 file can then be sent or routed directly back to the BOFD 88 via a secure electronic link such as the existing Federal Reserve System using the standard Cash Letter File format or via Virtual Private Network (VPN) link into a private bank or into a third party EPCH and the like. The ability to re-generate at will (or at any future time) a fully compatible Check 21 digital image without scanning or handling a paper IRD is a further unique element of the present invention. The benefits of this feature are derived from the fact that the auto "regeneration" process avoids the errors of paper scanning and is a great benefit to banks in reducing the amount of labor involved in handling of paper items. Thus, there is no need to scan an IRD submitted for deposit in order to generate the front and back check image in standard Check 21 format. The regenerated image and data values can be generated directly from the EPS 66 and sent back to the BOFD 88 in a standard Cash Letter File for further image exchange processing.

The tracking module 108 is configured to provide real-time and historical tracking of each DOC created and processed through the EPS 66. The present invention allows the DOC to be generated through the EPS 66 anytime with a full history and audit trail. This is because the DOC is electronic and all interaction with the EPS 66 can be recorded, monitored, and tracked through the tracking module 108. Additionally, the DOC can still be processed locally on paper as an IRD, or it can be recreated and sent into a bank again as an electronic item at will. All of these concepts are based on the idea that the DOC is built around the metadata "instructions to pay" which are stored in the DPF, and the tracking module 108 which can track the various payment steps by recording data in the DPF. The tracking module 108 provides similar information as an overnight shipment tracking feature, such as with UPS or FedEx. The DOC issuer can view real-time status related to the DOC to determine when it is received (which can also tie to an auto-notification feature), additionally if the EPS has access to the DDA account or if the EPS has a stored value amount on deposit representing the DOC then it can also know when the DOC was cashed, if and when it is endorsed to a third party, and the like. Additionally, significant events related to the DOC can be pre-subscribed to auto notify when they occur. For example, the payor can be auto-notified when the DOC is retrieved, deposited and optionally settled and cleared.

The tracking module 108 can also provide a flexible "stale check" feature. Traditionally, checks have a standard requirement to be cashed within 180 days. The DOC can have multiple clock states and limits which govern who may cash it and in what time frame they may settle or clear the check. The clock on the DOC can be set to determine how long a payment can wait before becoming "stale" or what is called the DOC "Time To Live" (TTL). Also, other clock limits can be set for when the DOC should be issued (to ensure it reaches the payee at some future payment date), when it can be cashed or cleared, a specific cancellation TTL range, a TTL range to allow for endorsements (useful to force a contract to be signed), shipping TTL, receiving TTL, pickup TTL, and the like. Using the tracking module 108, status of the DOC can be determined in real time whenever a user or bank checks with the EPS 66 to process or forward the check. Thus there are multiple timer events being set or fired based on status. A user subscribes to these events or requests to be notified when a check clock has reached a certain state. Further, this can tell the payor when someone has printed the check as an IRD, when it was "cashed" via electronic deposit, or when it cleared (when it is drawn on a bank account integrated into the EPS, or the EPS maintains a stored value account for the payor or via various EPCH integration concepts including ACH settlement and the like).

The authentication module 110 is configured to provide security relative to creation and processing of the DOCs. For example, the EPS 66 uses the GUID to lookup the DOC transaction and determines how to authenticate the payee based on the authentication level chosen by the payor when creating the DOC (or setup by the payee as a condition for retrieving payments from the EPS 66 under a specific name or ID). Authentication levels can include nothing (i.e., just knowing the transaction ID or GUID is enough security for the payor), or requiring a set of unique credentials (e.g., unique account number and login ID into the EPS 66 which utilizes a well known PKI method). Using private digital security signature key features (e.g., using a public key cryptography system) allows the EPS to verify and identify both payor or payee as either originator or receiver of the DOC. Also, utilizing public key cryptographic methods allows the EPS to guarantee identities for non-repudiation of all parties known to it and involved in the transaction. Either way, the there can be various levels of security agreed to by one or both parties which are supported by the EPS 66 for authentication.

The processing module 112 is configured to allow payors 84, BOFDs 88, clearing banks 90, and clearinghouses 92 to process and clear DOCs through the EPS 66. As described herein, DOCs are identified through the GUID or the like. Once identified, the processing module 112 enables forwarding or clearing of the DOC. For example, the processing module can generate the electronic image file and send it to the bank of first deposit for further processing by the "Item Processing" department within the bank. As these re-creation requests arrive at the processing module 112, the original metadata values (or the currently stored values) are retrieved from the system and used to re-create the digital check file in X9 format for further image exchange processing. This electronic X9 file can then be sent or routed directly back to the bank of first deposit via a secure electronic link such as the existing Federal Reserve System using the standard Cash Letter File format. The regenerated image and data values can be generated directly from the EPS 66 and sent back to the bank of first deposit in a standard X9.180 Cash Letter File for further image exchange processing. Thus, this further demonstrates that any items produced by the invention are built using a fully Check 21 compliant process from electronic metadata (instructions to pay) stored in a database (DPF) instead of scanning paper or existing check image data. Since DOCs clear through system as digitally originated, they do not need Item Processing (sorting, imaging, etc.) to be cleared. All of the info needed to clear or process a check is stored in the DPF, therefore the DOC can be forwarded onto the Fed network or the clearing bank automatically by the receiver (BOFD) or any independent Check 21 image service which performs the Electronic Payments Clearing House functions (EPCH).

A unique element of the present invention involves the quality of the Check 21 images that are generated by the digital origination process. The DOC generation 104 module is configured to create DOC images with exact image quality such that they pass Federal Reserve Image Quality Assessment (IQA) tests without error or corrections required. Because the "bits" or "pixels" of the DOC Check 21 image are generated from the EPS metadata, only those bits which should be "black" or "on" are enabled, eliminating background image noise, random bits or errors in the image. A DOC generated image contains only those bits which provide information as defined by the metadata; no extra or random bits are enabled in the black and white image received by the bank clearing system. Additionally, the image as seen by the payor or payee can have an optional background image, but this image is removed when it is processed by the EPS for transmission to a bank or clearing party. This optional background image allows users to have their favorite image on their check backgrounds yet avoids the well known "puppy and kitty" problem which occurs when paper items containing background images are used as input to Optical Character Recognition (OCR) algorithms which identify the amount of the payment. That is, the optional image is striped out, leaving a pure black and white image (black metadata on a white background) with no extraneous images or pixels to get in the way of further processing or image testing. Thus, because DOCs have enhanced image quality, the EPS generated DOC image can easily pass the internal depositing bank's clearing system or the Federal Reserve internal IQA tests (see e.g., www.frbservices.org/Retail/check21TechInfo.html "Black and White Image Standard and Quality Checks" document incorporated fully by reference herein) which measure "noise" as well as "blackness" of an imaged item. Additionally, having optimal image quality eliminates the chance for OCR errors whenever an image file is utilized as a source document for subsequent image processing. Thus DOCs can avoid the well known "copy of a copy of a copy" problem that is inherent in any paper based document processing solution.

Additionally, another unique element of the present invention is the EPS 66 is configured to provide a more efficient mechanism for stop payment of DOCs. Canceling a paper check is inconvenient and often not available given the faster clearing times under Check 21 truncation. For example, the payor has to go down to the bank, sign a form, and hope to catch the check in time. With a DOC, the payor can cancel it immediately, or put it on hold, etc. through the EPS 66. Also, the payor can permanently void the DOC, and a new GUID would be issued if the check is re-issued. Advantageously, this allows the payor to know if a DOC is canceled prior to issuing another in replacement. It's fast, easy and immediate—features that allow check payments to better compete with the other electronic payment clearing mechanisms under the NACHA ACH system.

Another unique element of the present invention involves the EPS 66 and the processing module 112 utilizing the unique, automatically generated payor Positive Pay Database (PPD). Traditionally, only corporate customers who have a Treasury Management account feature tied to their high value business DDA account have been able to tell the banks which checks to pay and which ones not to pay (i.e., positive or negative pay lists). The Positive Pay Database (PPD) is an automatic feature of DOC creation, i.e. the EPS knows when a DOC was created, therefore it knows which "checks" to pay, thus only authenticated and genuinely issued DOCs can be cleared. This auto PPD feature gives consumers a benefit that businesses have had for years. This is an internal PPD, and the EPS 66 also has the ability to send DOC creation info (PPD) out to a clearinghouse (EPCH) so that external users can verify a good check (e.g., traditionally the bank would not tell external receivers PPD info but the EPS could expose this if desired with the auto PPD feature). External PPD info can also be issued from financial accounting software as inputs into the EPS or to the EPCH. Use of strong security and non-repudiation mechanisms provided by public key cryptographic systems can provide an additional level of security, audit and tracking features to DOCs. Note that once a DOC is issued and possibly digitally signed by a payor there is an automatic Positive Pay Database feature established. Whenever a check needs to be verified before it can be issued as an IRD or cleared, at a minimum the EPS can use the check number, GUID or Transaction (Tx) code provided to it and compare it to the known values stored in the DPF. Having additional levels of security allows even stronger levels of authentication and verification to occur. But at a minimum, the EPS can use the GUID to see if it the requested item is indeed a valid DOC and also verify that it has not already been cleared. Thus, under ideal conditions involving a PPD, PKI and secure authentication methods, one and only one DOC will clear as a payment.

Additionally, the payor can establish DOC controls prior to issuance of the DOC. This permits the payor to dictate conditions with which the DOC is transmitted and negotiated. The payor can set an individual PIN number on the check for security, or they can specify the type of deposit allowed (pre-certify the check for example, or no-conversion to 3rd parties etc). The payor can also set the Time-To-Live (TTL) or other stale date limits (x days to deposit), where it can be deposited if electronic (i.e. in US only), or prevent ACH truncation, enforce multiple endorsements required, conditional agreement, fulfillment of a contract or escrow agreement before clearing, and the like. Finally, the conditional payment features can control the release of payment only upon the payor receiving delivery of some goods or services—this would facilitate the re-creation of the old Cash On Delivery (COD) UPS delivery method into a new DOC On Delivery (DOD) method where the DOC was released by signing for the package using electronic signature capture devices such as a UPS signature pad and the like.

Further, the EPS 66 with the tracking and processing modules 108,112 can include attached instructions or appended files with payment. Check issuers and check cashers can upload documents such as receipts, agreements, customs clearance documents, shipping documents, links, EDI documents such as PO's or Invoices, etc. and append them to the DOC transaction file. Documents can also be attached to "sign-off" completion of various stages of the check endorsement process. File attachment features are useful for "Escrow or conditional payments" where additional data is required to verify that a stage in the payment clearing workflow process has been completed or verified that it has taken place—allowing verification or evidence of work before a check can be cashed.

Figure 6:
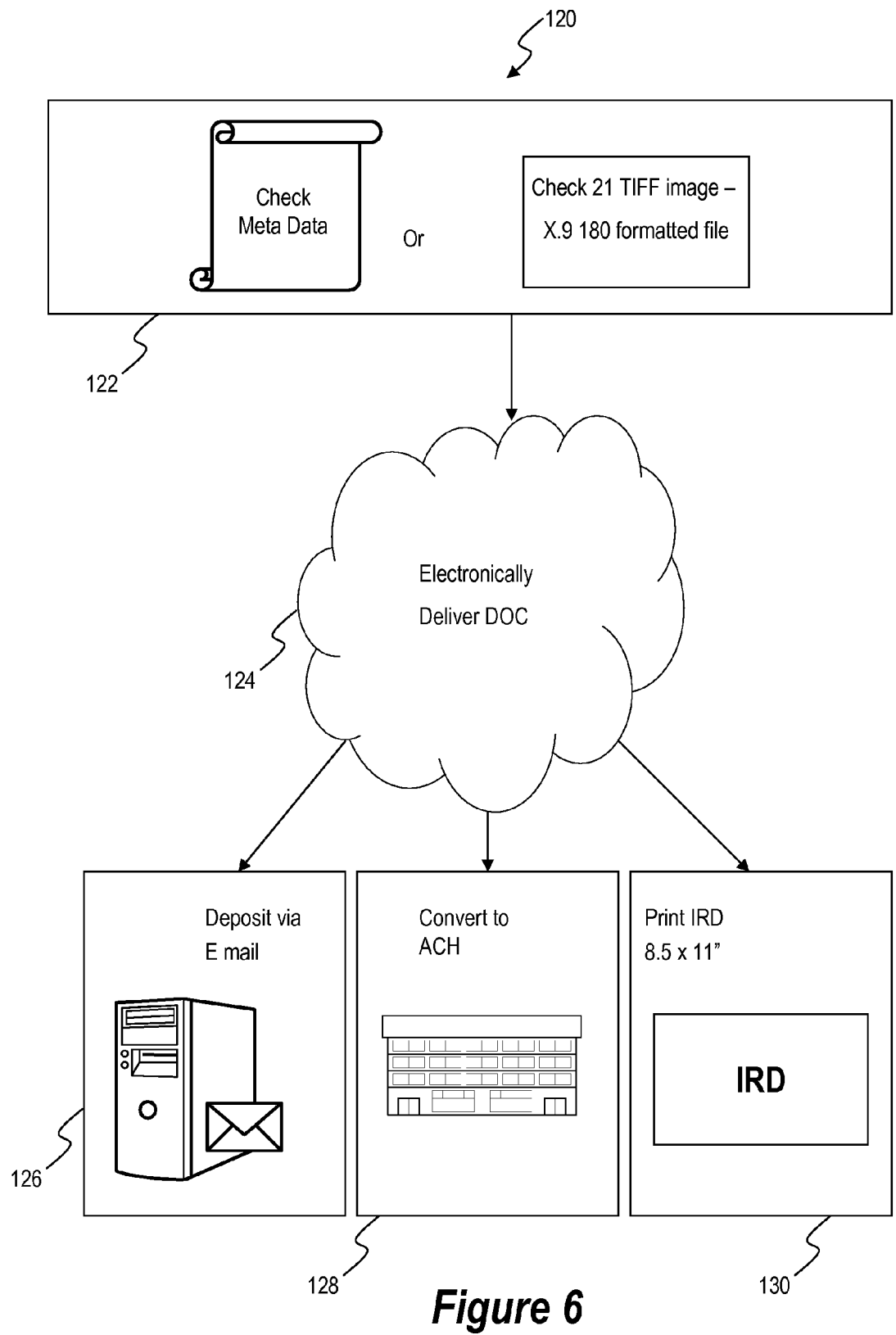
FIG. 6 is a flowchart of a DOC delivery system according to an exemplary embodiment of the present invention.

Referring to FIG. 6, DOC delivery 120 is illustrated according to an exemplary embodiment of the present invention. The DOC is generated either through check metadata or printed in a Check 21 image according to X9.180 file format (step 122). The generation of the DOC can utilize the various mechanisms described herein. The DOC is delivered electronically (step 124). Of note, the electronic delivery can include a variety of mechanisms, such as email with a URL or embedded image, email with an attached file, email with an encrypted file, IM, SMS text, fax machine, URL, and the like.

First, the DOC can be sent as an IRD via an embedded JPEG or other image type in an email message. When the payee opens their email, the payee is presented with an "image" of a check in IRD form. The user prints the email and takes it into a bank for deposit (step 130). Note, the image can include an optional barcode and it is in the form of an IRD X9.140 file. Therefore, the image is a valid IRD and the bank accepts it based upon the contract between payor, his system, and payee to extend the rights and responsibilities under Check 21 to all parties. Additionally, the check image does not need to be in IRD format to be processed electronically. This can be accomplished using a custom MIME type to handle the check image viewing within the email program as way to notify the computer than a "check" has arrived and not a random graphic picture or image, i.e. when using a MIME type there is an intelligence that is conveyed or created when the payor generates an image that the EPS (the originator) knows to be an "item of value" (i.e. money) so the actual message that is delivered is encoded with the MIME type to convey that knowledge to the payee. This check image concept is similar to the difference between the actual object and a picture of the object. A custom MIME type is embedded or attached to the check image in the email and when the payee opens the email this MIME type is recognized by the OS or email program in order to load the image using a special process given that the payees software knows that this is a special object that has value (i.e. a check). This concept can include a "thumbnail" image to show recipients that a valid check image is attached, but in an human unreadable form such as in encrypted form. Additionally, a PIN could be required to secure the decoding of the image via a digital key.

Also, the DOC can be sent as an encrypted file. The DOC issuing system (thick client or website) can use a shared PKI infrastructure (built by EPS or by an outside EPCH for example) to generate the DOC (with payment instructions), then grab the payee's public key to digitally sign or to encrypt a DOC image/IRD into an automatically generated but encrypted file such as Adobe PDF and the like, so that only the recipient/payee can open the PDF file using their private key. Note the recipient has to previously register with the EPS or EPCH to generate the PKI key pair (storing the public key online, and the private key somewhere under the control of the payee) and that private key is required to be available to any machine where the encrypted PDF DOC image is opened. This is a simple, low cost "client side" security model that leverages the free and widely-available Adobe PDF reader client or other widely distributed software client that supports PKI encryption methods and the like.

The present invention also contemplates other DOC delivery methods such as Instant Messages (IM), voicemail, URL, SMS text, as well as other future electronic communication mechanisms. Since the DOC is in digital form (i.e., not an IRD), the metadata or Check 21 electronic items have various options which can be used as delivery mechanisms (unlike paper checks which must be physically transported). Besides email, a URL pointing to a DOC can be sent via IM, cell phone SMS text, and future electronic communication mechanisms etc. This idea eliminates paper printing, postage, transport costs, handling, storing, securing, and processing/sorting of physical paper items. Alternatively, the present invention contemplates transmission using a correctly formatted IRD from a computer to a facsimile machine (FAX). This method can be used when the payor does not have computer or email access. For example, a payor could fax a check to a payee at a shared service center, such as at a UPS mail store, allowing the payee to go in to the store and pickup the check as an IRD and conveniently deposit or cash it. This can also be performed by converting the DOC into a money order type and electronically delivering it to check cashing stores or Money Order outlets such as Western Union and the like. Advantageously, this can eliminate the need and expense of sending a paper check via "overnight delivery" while providing almost immediately delivery.

Also, the payor can "park" a check into a "locker" for later use by creating the DOC but not having the EPS send it immediately. The DOC can be stored at the creation service (i.e., EPS) which returns a URL (like a claim check) to the payor which "points" to the "parked" check which is waiting for some future event to occur before further processing starts. The payor can send the claim check URL to the payee via IM, voicemail, or any other alternative delivery mechanisms. The payee uses the URL (with PIN) to retrieve the DOC from the "locker" where it was parked and then deposits it (IRD or electronic deposit) into their own "locker" or account. This can enable a scheduled payment service (e.g., for online bill pay) or for a "temporary" check which is sent when needed. This can also cover the idea of a payor generating partial DOC payments, i.e. everything but the payee name is known to the payor ahead of time, so the DOC is prefilled in with the value amount and other payment info. This allows for a unique digital way to solve the payor problem of "to whom do I make out the check" etc. This can also allow the payee to receive the DOC with a "blank" payee field and "auto-stamp" their name/account info into the DOC tying back into the regeneration of payments (i.e. DOCs are not static images) and other metadata driven concepts.

Once received, the payee has several options on how to proceed with the DOC, such as deposit via email (step 126), conversion to ACH (step 128), and printing an IRD (step 130) as well as other payment forms or truncation methods and the like. Once the payee has been notified, the payee uses the unique transaction ID (GUID) which was provided to them in the notification message to identify which specific DOC they wish to retrieve. The EPS uses the GUID to lookup the DOC transaction and determine how to authenticate the payee based on the authentication level chosen by the payor when sending the DOC (or setup by the payee as a condition for retrieving payments from the EPS under a specific name or ID). After satisfying the authentication and security tests, the payee has a choice in how to proceed with the depositing or clearing the payment for credit to their account. After retrieving the DPF record for the specific DOC (using the GUID), the EPS can generate a DOC image (in Check 21 image format) and display it directly onto a website page and other UI method in order to present the specific check image to the payee for the payment which they have received. Viewing a payment in check image form allows the payee to confirm that this is indeed the payment they expected, that it has the correct payee name or identifier on it, it has the correct value amount and has other optional business rules and processes attached to the payment which the payee can confirm prior to depositing the payment.

After reviewing the DOC on the EPS webpage, the payee has a choice in how to proceed with claiming their payment. The first and simplest choice is that the payee can choose to print the DOC as an IRD onto paper using their own printer and then deposit it at a bank teller's window like a traditional paper check. Alternatively, the payee can have the EPS "forward" the DOC electronically into their bank as an electronic Cash Letter File for deposit saving the time and effort of a trip to the bank. In the preferred embodiment of this invention the example of a "forwarded deposit" via the EPS uses email, sending the ICL to a known bank address (for example, it could be listed in an ABA directory just like their routing numbers are listed), such as deposits@bankxyz.com, where the banks computer systems, utilizing an EPS provided hardware appliance or webservice or API, can remove the attached ICL file to credit the deposited item. Other forms of receiving a payment can be supported by the EPS including converting the DOC into a non-check form of payment such as ACH, ATM or Wire Transfer methods and the like.

The present invention can enable a true "remote" deposit via cash letter file with an image for everyone when they receive a DOC. This is not the same as the existing "Remote Deposit" concept where a customer writes a paper check at checkout and the merchant scans the MICR line to perform an ACH "POP" truncation. This is because the present invention utilizes no paper, no scanning, can do remote deposit anywhere with no POS equipment needed, plus the DOC legally stays or clears as check and not an ACH item, and can include Auto Franking/deposit stamping (For Deposit Only) features, etc. and the like. Using the transaction code or GUID, with a website or 1-800-Check Me type verification service provided by the EPS, a user can remotely push the DOC into their account, electronically as a check (image exchange). Additionally, the payee can deposit the DOC to an ATM network. Most ATM machines today are enabled to perform Check 21 image scans so a payee could take a DOC in IRD form and deposit it into an ATM. The difference from existing ATM scanning methods is that the ATM could read the enhanced IRD barcode to re-hydrate the DOC easily back into electronic form without OCR'ing the image to determine the amount and account data. ATM networks could simply "pull" the DOC into the BOFD via barcode scanning. The ATM network (different from the bank) is motivated to clear the check since a new fee could be charged for the convenience. ATM machines can scan the PDF417 barcode on the enhanced DOC IRD to facilitate the auto deposit of a DOC at the ATM machine.

The EPS which issues DOCs can also to convert a DOC to ACH item as an alternative form of truncation. This is like the "POP" or "ARC" concepts known in ACH payments today. To do this, a new NACHA SEC code is used, such as "DOC" for the appropriate three letter ACH clearing code. This ACH payment type would truncate a DOC check (under the Electronic Funds Transfer (EFT) guidelines) and convert the DOC into an ACH item for routing via normal NACHA electronic file and NACHA Rules (settlement, etc.). Advantageously, the check receiver or the BOFD can select the lowest cost routing/clearing method for them. If the payee or BOFD is a high volume ACH user they may prefer DOC to ACH truncation versus Check 21 item clearing methods.

Additionally, using DOCs as a starting point (or end point), an additional feature is enabled at the EPS allowing for the switching and conversion of a "digital check" to and from other payment "rail" forms, such as Remotely Created Check (paper), Cash, Credit, Debit, ATM, Wire, and the like. This idea is an extension to the ACH POP/ARC truncation concepts, i.e. DOC to ACH, as the DOC item is switched or converted over to alternative networks and clearing rules or law. For example a payee could "cash" a DOC at an ATM, or apply a DOC to a Credit Card account, or deposit it to a PayPal or other stored value account, or if appropriately secured and confirmed convert the DOC into a wire transfer message, or alternatively provide a DOC to cash method via a Money Order (e.g., via Western Union draft or USPS Money Order), or vice versa (ATM into DOC, ACH into DOC), etc. The EPS is configured to receive Check 21 compliant cash letter files and convert them (one check per file) into other payment types given some additional payment instructions (metadata). Also, a DOC could be applied as a credit to a credit card account (like a returned item from a merchant), i.e. translate the DOC into a credit card transaction as a merchant credit payment. The DPF stores "digital instructions to pay someone" which can include how to pay (conversion info) that the EPS switch uses to determine where and how the payment should go. Also the sender (payor) can do it or the receiver (payee) can decide when to add instructions to convert DOC into another more useful form for their needs. Further, when printing to an IRD, the present invention can create and correctly prepare (accuracy in amount, etc) a digital deposit slip for the DOC which facilities the customer remote deposit concept. Using payment metadata, Digitally Originated Deposit Slips (DODS) can be generated, making it easy to deposit DOCs. These deposit slips are created when a DOC is received or pulled back into a bank; the DOC is created on the fly, as there is no actual paper slip needed.

Figure 7:
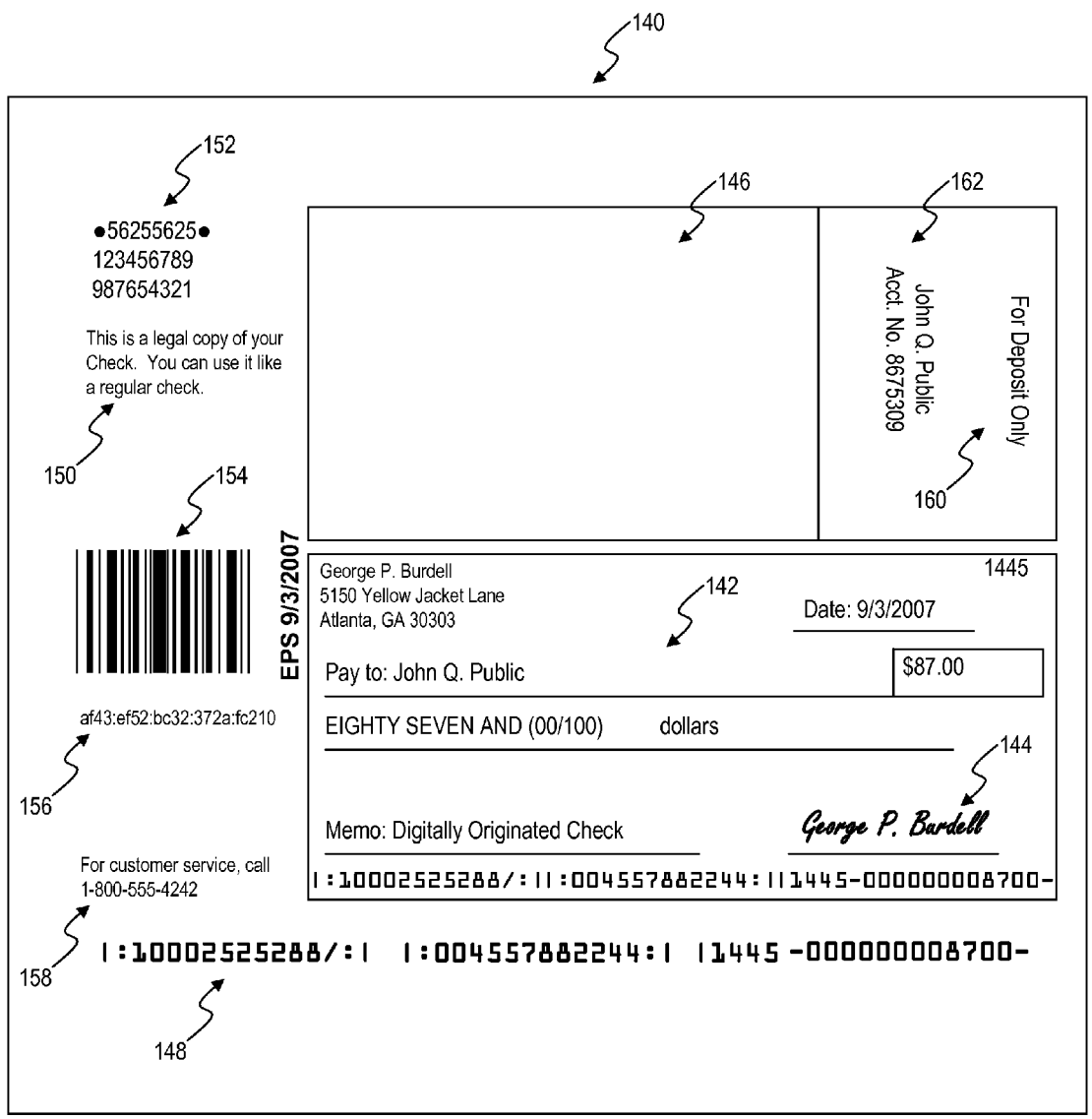
FIG. 7 is an illustration of a generated DOC image according to an exemplary embodiment of the present invention.

Referring to FIG. 7, a generated DOC image 142, 146 is illustrated according to an exemplary embodiment of the present invention. While the DOC can be transmitted electronically, it can also be used to generate the X9.140 standard "substitute check" or IRD 140 which results in a paper version of the original digital check. The IRD can be printed by the payee and taken into their bank for deposit because it contains a full set of warranties and indemnities based on the original contract agreed to by the payor and payee which the EPS required to be signed in order for the DOC to sent or received. Because DOCs are covered under this contract, they have a full set warranties and indemnities that are acceptable to both banks of deposit and downstream clearing banks. This DOC feature, an IRD possessing a "full warranty" state, differs from other attempts by either businesses or individual consumer users who want to print their own IRD documents and deposit them at a bank because those documents may not be accepted by the bank of first deposit due to the depositing bank's inability to take on un-transferable risk from an unknown originator of the IRD.

The DOC image 140 is formatted similar to a standard X9.140 IRD including a standard check front 142 with a digital signature 144 and a standard check back 146. Additionally, the image 140 includes a Magnetic ink character recognition (MICR) line 148 and a legal legend 150 as required by Check 21. Further, the DOC image 140 can include processing and routing information 152 associated with the EPS, a two-dimensional barcode 154 such as the PDF-417 format to facilitate enhanced data encapsulation, faster processing and security, a GUID 156, and customer service information 158. The routing information 152 can be used by itself or in conjunction with the GUID 156 to allow the EPS to track and perform other functions with the DOC image 140. The barcode 154 can be used in conjunction with a barcode reader to read all of the information associated with the DOC image 140. The GUID 156 provides the unique transaction ID associated with the DOC image 140 and the corresponding DPF. Finally, the information 158 can be used by banks and others to assist with issues or questions related to the DOC image 140. Note, DOC images 142 and 146 are dynamically generated to form the IRD 140. The images 142 and 146 are dynamically generated from the metadata, and used to form an X9.180-compliant and X9.140-compliant IRD.

The present invention can use the standard "check number" digit field in the MICR line to insert a PPD number instead of the check number used in conjunction with the account number. This PPD number could be used to tie back to the check verification database, such as a hash of the actual DDA account number+check number=PPD unique key. The present invention can support a custom MICR line usage. This PPD number could be a hashed value of the check info used to do a quick verification that a DOC is legitimate. Alternatively, a EPS generated GUID value could be used in place of the traditional check number field.

The GUID 156 is a large, algorithmically generated, unique number. The mechanism uses a given a set of inputs as seed values and then generates a 16-byte (128-bit) number which is unique among all users at any time, everywhere on the planet. Using GUIDs 156 as either hidden or visible check numbers ensures which DOC has been issued, cleared, etc. and facilitates tracking the check anywhere, anytime, electronically or by IVR (phone) or human lookup. This is unlike pre-printed check numbers as they are generated on the fly at DOC creation time. A GUID 156 can also serve as a Transaction ID (Tx) to find/locate a specific check within all the checks. GUIDs 156 can also be captured in the PDF417 barcode embedded on an IRD or check image The present invention provides DOC images 142, 146 with superior quality and characteristics. Using a traditional scan of a paper check, a high speed reader/sorter machine takes a picture of the front and back of a check. Several errors can be introduced during this mechanical paper handling process which impact further electronic processing of the image and subsequent Check 21 file. Due to inherent mechanical and optical system design defects, any mechanical paper handling process is subject to jams, miss-feeds and misalignments of the paper which result in either missing images or bad quality images (blurry) or miss-aligned images (alignment measured as degrees off or away from a horizontal axis—called skew). The impact of these scanning flaws, while rare on a percentage basis, occur so frequently in the huge volume of paper checks that the Federal Reserve System has mandated the adoption of IQA tests. Thus the IQA tests are designed to identify and reject images which do not conform to both the Check 21 standard overall as well as the specific "readability" or "legibility" tests that the banking industry has agreed are minimum requirements.

The digital generation of the DOC image 140 creates none of the traditional paper image quality errors. Second, because there is no paper item to scan, there is no resulting image skew from a non-existent horizontal axis based on the edge of the paper. The DOC image 140 is always generated with zero degrees of skew in the image. Next, the DOC image 140 has high quality images as measured by industry standard Image Quality tests which is independent of dpi resolution due to the fact that a pure black and white bitmap is generated from metadata and not from a scanned paper item (which results in noise being introduced by the surface of the paper item). With the DOC image 140 there are no stray black noise elements, only the exact letters, numbers, fonts, and graphics which are present. The metadata instructions generate individual black bits in the bitmap. Because the DOC image 140 files have exact image quality (pure black and white with no random image noise), and have zero degrees of skew (i.e. they are perfectly aligned to the horizontal axis of the image file), they are always readable by both humans and computers using the lowest image resolution form of Check 21. Thus, this enhanced readability reduces the chances of optical character recognition (OCR) errors of the Courtesy Amount Recognition (CAR) and Legal Amount Recognition (LAR) fields if the check image is scanned by banks who still handle paper IRDs. Finally, the well known industry problem of background image "interference" (this generically is called the "puppy and kitty" problem due to the wide spread existence of these type of background images on many consumer checks) is also avoided because the DOC image 140 does not contain any background data.

Because a DOC is generated from metadata, it can be dynamically generated in many forms. First, the DOC image 140 can be generated in many resolution levels (measured as dots per inch or dpi) which are independent of the chosen bitmap format, such as JPEG, TIFF, PNG, and the like. Second, when the DOC image 140 is generated by the EPS, it can be generated to include optional data such as human signatures for easier processing in paper form. This optional or conditional data (on the front or back) can include instructions from the payee or depositing bank about depositing or clearing features of the specific payment. Examples of this include merging a "human digitized signature" 144 as the authorized signature directly into the front (or back 162) image of the check, even though it was never printed or signed (using the e-signature laws). Note that this "digitized signature" feature works if the payor or payee has uploaded samples of their human signature or other handwriting samples (ex. Agreed and Accepted), or they could choose to use a font that displays in "handwriting" format to simulate their human signature, or they could agree to use "Signature on File" and the like—any of these could satisfy the e-signature law as their authorized legal signature. Another example includes a "For Deposit Only" style stamp 160 for the back of the check, an account number for the deposit 162, or other contractual restrictions (such as agreement to a contract if the check is deposited) that are required by certain business processes or agreements. Thus, the image 140 form of a DOC file can contain valuable, optional data in both machine and human readable form without requiring paper processing. This further automates the processing and handling of checks and speeds up the overall business process between payor, payee, and the banking system.

The DOCs are created from metadata "instructions to pay" which are similar in features to a "vector image file" vs. a "raster image file". The benefits of using metadata (like the equations describing a vector) to generate a DOC image is that it provides flexibility in how the image 142,146 is generated. For example, under X9 standards a Check 21 image is required to be a Black and White (B/W) 200 dots per inch TIFF image. Using the DOC invention, the EPS can generate DOC images 142,146 in a variety of formats such as small X9 B/W images which reduces the file size of a DOC or as a high resolution JPEG images using a grayscale format for enhanced readability or clarity. Dynamically creating the "check image" gives you flexibility and choices which are suitable to the requirements of the final use or format. Thus for storage, ideally only DOC metadata is stored, but alternatively a DOC image can be made as small as possible given the amount of check data that must be displayed. This is useful for banks storing large numbers of check images. Additionally, the DOC image 140 can include low resolution image versions for creating IRDs and high resolution used for customer statement presentment or online viewing. An EPS can also produce DOC images at whatever resolution (or format—TIFF, JPG, PNG, etc.) is needed by the requesting system for storage or printing. The DOC record, i.e. DPF, does not contain an image, only instructions to pay, thus any image type can be generated on the fly as needed. Also, the DOC record is very small (e.g., on the order of 400 bytes vs. 400 kilobytes for an image) which can be stored very inexpensively and converted into larger formats for different purposes. This eliminates the need for banks to use a check image storing service such as ViewPointe. Instead, when needed in the future, the DOC image can be generated dynamically and pulled back into the bank to be used for customer statement processing, dispute resolution or legal evidence, etc.

Further, current Item Processing, check sorting, and encoding methods require the imaging system to validate and compare the Curtsey Amount box with the Legal Amount field and use OCR to determine the Amount to Pay. These algorithms are not perfect and they can mistake a handwritten "7" for a "1" for example. These are called substitution errors and banks want to keep these error rates as low as possible. Having errors forces banks to keep human operators around to compare by hand these amounts and correct these errors. DOCs images 140 are generated from digital instructions, so if they person types a "7" they will get the image of a "7" on the digital check image.

Additionally, the DOC image 140 can support electronic endorsements such as the "for deposit only" style stamp 160 and the account number for the deposit 162. This covers payee endorsements on the front or back of the check image but not Bank Item Processing Stamping. The payee can endorse a check electronically with their "human" signature, their bank account number, and add phrases like "For Deposit Only" endorsements that would normally be performed on a paper check but in this case because they have a DOC file so the metadata generates these images for them. These features can be performed automatically onto the back of the check image using the EPS service features. Also, the endorsement of multiple payees can be easily coordinated in a controlled fashion to satisfy legal or contractual endorsement requirements before a check is negotiated for payment and clearing.

Similar to "electronic endorsement" features, using metadata and other digital technologies, any bank department or receiver of the DOC can automatically sign or endorse the check for processing and clearing after the DOC is deposited. This idea covers the bank stamps, time stamps and automation tracking features of a DOC lifecycle. Items to track and stamp include, who cleared the check, when, and how, along with notifying a payee that an item is a NSF item, etc. Being digital and metadata based, the EPS updates the audit trail in the database of DOC history. Second, because DOCs can utilize the concept of an "image overlay" the EPS can add layers of digital stamping to the back of a check. This is not manipulation of the existing image, but instead generating each stamp in its own image layer one at a time by providing an "image overlay" layer on top of the existing DOC back of check image 146. Note that at DOC creation time, the back of a DOC image 146 is a blank image of a check back. Other unique elements of this feature are the idea of having room for "more than one" signature when multiple endorsements are needed or used, such as a third party check turned over at a store. Only the last signature is shown of back of check image 146, others are kept on file in metadata, or a statement can be added saying "signature is on file" and produced as needed. The same idea can apply to bank processing of DOCs, their "stamps" can be digitally added and only the last one is shown if desired or if no room or if illegibility would be created by stamping over top of each other. For example, the most recent image can be kept in the display, but all other images are on file. This feature is also useful for NSF checks to explain why the item was returned. Check 21 provides for NSF re-presentment, but the present invention makes the back of the check image clearly legible no matter how many back and forth attempts were made to cash the check. Another benefit is the franking features are always clear and readable, thus there is no need for a "high resolution" image of the back of the check.

In another exemplary embodiment, the present invention can include check stubs which hide sensitive payor data from a payee. This can be useful for DOCs issued in payroll scenarios or used as a paper receipt for a DOC that explains what the DOC was for (amount, memo, date, etc.) but does not include account number it was drawn on. The stub can include GUID 156 for tracking and a stub can use the same "800-checkme" validation concepts as IRDs, i.e. the customer verification information 158. Generally, DOC stubs are for the NON-IRD deposit scenarios, similar to what is needed for direct deposit (ACH) scenarios where a payroll service needs to show proof of what was done electronically to the payee. Additionally, the present invention can create and correctly prepare (accuracy in amount, etc) a digital deposit slip when you receive a DOC, facilities the customer remote deposit concept. Digitally Originated Deposit Slips (DODS) make it easy to deposit DOCs along with enhanced check stub features.

The barcode 154 can include a UPC code or a PDF417 barcode (storing Transaction info) or USPS barcoded street address (or the payee email ID). This can be embedded on a DOC image 140 to allow for efficient clearing and processing by IRD receivers. Scanning the IRD allows for automated check information to be captured—the amount, who, what, the GUID or Tx code, etc. Also, the barcode 154 can encode the MICR line data so item processing can read a reliable medium for MICR interpretation. This allows non-bank, non Item processing capable environments (retail stores, offices, homes, etc.) to process IRDs when they have a barcode scanner or alternatively they can use the GUID 156 to push the DOC into the banking system versus processing the paper IRD. The present invention can also create a branded security set of features that have a visual representation like the Padlock icon on printed checks. This can also show compliance with X9 standards.

Figure 8:
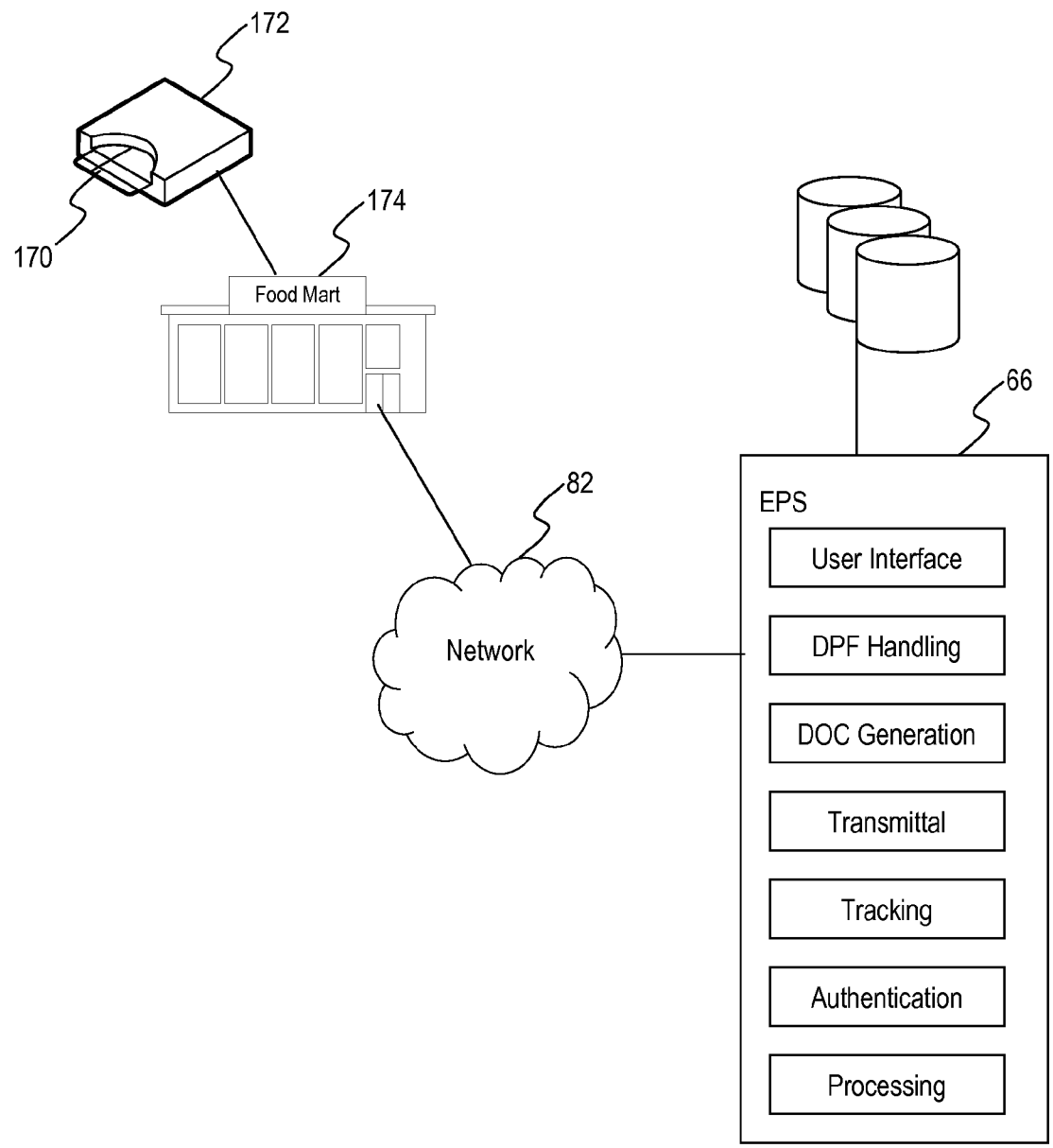
FIG. 8 is a flowchart illustrating DOC generation via a True Check Card according to an exemplary embodiment of the present invention.

Referring to FIG. 8, in another exemplary embodiment of the present invention, a plastic "credit card" format can be used to make a DOC true check card (TCC). The DOC check card 170 can be used to make purchases at merchant Point-of-Sale (POS) terminals 172 instead of paper checks, credit cards, or debit cards. POS terminals 172 are a common payment device located at a variety of stores 174. The present invention provides a true "Check Card" which is a plastic card issued to a checking account holder which generates DOCs when the second or alternative magnetic stripe is swiped at the POS terminal 172. Traditionally well known "check cards" or branded Visa "check cards" actually perform an ATM or ACH debit transaction against the holders account. However, the DOC check card 170 actually utilizes a DOC when the second magnetic stripe is swiped, and a message is generated containing all of the metadata information required to generate a DOC through the EPS 66 to which the POS terminal 172 connects over the network 82. Here, the merchant is automatically designated by the POS terminal 172 as the payee. The POS terminal 172 generates a custom DOC message similar to the International Organization for Standardization (ISO) messages used by the Merchant Acquiring bank networks to process credit card or debit card transactions. The merchant bank network automatically routes the DOC message to the EPS 66 system, the DOC is generated and it is then immediately deposited to the merchant's bank account. This TCC swipe accomplishes payment and deposit in one step.

This mechanism may require the creation of a new ISO card format or message as well as a second enhanced magnetic stripe on the card to enable the existing Interchange networks to clear these "check card" transactions. Check certification and verification can also be used in conjunction with this system. If the swipe "message" was used in conjunction with ATM or ACH network, then payments could transfer instantly. It is also possible to generate a DOC check that gets instantly POP'd or ARC'd and processed as an ACH item. This route would take longer than ATM but faster than conventional checks. Sales receipts can also be merged using the DOC "file appending feature". This could allow merchants to easily receive checks as payments from customers, this is not a debit card, but a true check card that when swiped generates a DOC, with instructions to pay the merchant (added by POS terminal 172). The check card 170 knows the checking account ID and if a smart card, can remember balance, last check number issued, Public Key Infrastructure (PKI) certificate, etc. Issuing a DOC by swiping the card 170 at the POS terminal 172 is fast, as there are no delays from handwritten checks, this speeds up checkout lines, is more secure, provides a lower cost payment for merchant, with enhanced deposit features.

Further, the TCC 170 can include a traditional UPC barcode for efficient check out via scanning at the various stores 174. The UPC code can eliminate the delays caused by customers "writing" checks at checkout counters. For example, the true check card 170 can be scanned for the UPC code on the plastic card instead of the second magnetic stripe, thus the POS terminal 172 knows the payor account info and automatically creates the DOC payable to the store 174. The UPC code identifies the DOC account, and is useful because the ability to read/scan codes is universally available with most merchant POS terminals 172, such as grocery stores without having to upgrade their swipe terminals to support the enhanced DOC magnet swipe stripe on the TCC. This concept leverages a similar idea where a PDF417 barcode is put on an IRD but this format uses UPC in order to provide broad scanning compatibility and to automate check writing (DOC generation) that is easy and quick even if the checkout lane does not have a debit card swipe machine.

Figure 9:
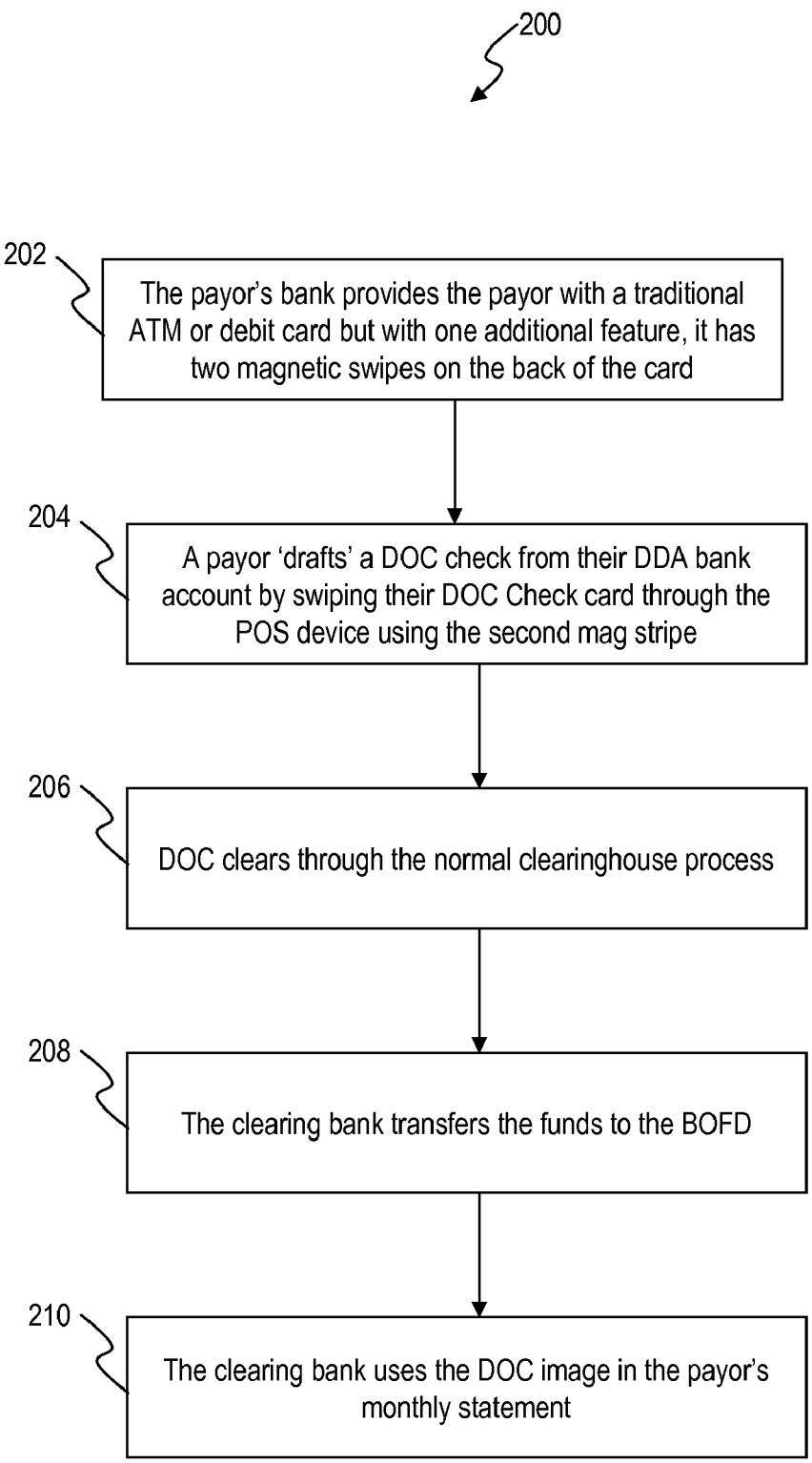
FIG. 9 is a flowchart illustrating DOC generation at a point-of-sale (POS) according to an exemplary embodiment of the present invention.

Referring to FIG. 9, in an exemplary embodiment of the present invention, a flowchart illustrates a DOC generation at POS mechanism 200. Here, a DOC is generated at a merchant POS device by swiping a credit card containing a second standard ISO track containing payor metadata, processed by the EPS and paid electronically throughout the banking system 40 of FIG. 3. First, a payor 'drafts' a DOC check from their DDA bank account by swiping their DOC Check card through the POS device (step 204). The DOC is created via a merging of payor and payee metadata at the EPS, and the DOC is issued as a valid UCC draft in electronic form. The DOC is created with user initiated instructions to pay someone (i.e. a payee), some value amount, under a set of conditions, limitations, restrictions, acknowledgements, and the like. These instructions are stored in a database—e.g. a Digital Payment File (DPF). These digital instructions are used to create a perfect digital check, and there is no paper check required to create these instructions and there is no paper origination or scanning.

The payor's bank provides the payor with a traditional ATM or debit card but with one additional feature, it has two magnetic swipes on the back of the card (step 202). One swipe is used to generate traditional ATM or debit card transactions while the other swipe is used to generate DOCs and clears the DOC through the normal clearinghouse process (step 206). As the DOC payment is processed or "cleared" by the banking system 40, the individual DOC file can subsequently be placed into a standard bank clearinghouse Cash Letter File (X9.180 standard) "bundle" along with other check items (i.e., digitally created or paper scanned images) and exchanged electronically with other banks. Currently, all of the traditional image exchange clearinghouse mechanisms support Check 21 image file exchanges including the Federal Reserve System, ViewPointe, The New York Clearinghouse and other EPCH systems and the like. Additionally, X9.37 image files are used as the "accepted format" in many private two party (bank to bank) image exchange agreements. For example, banks, such as Wachovia and Bank of America, can exchange image files directly with each other under private clearing agreements in the X9.37 format. Finally, the DOC clears through the clearing bank, the clearing bank transfers the funds to the BOFD (step 208), and the clearing bank uses the DOC image in the payor's monthly statement (step 210).

The traditional DOC payment instructions or metadata can be captured or generated in a variety of ways or methods implemented by the electronic payment system (i.e. an EPS can have multiple input forms) besides the website. The metadata could be generated by the merchant entering information into their POS device, or previously stored in the swipe device or provided by the Merchant Acquirer who processes traditional ISO messages into the credit card network, or by a home or office PC software application such as Intuit's Quicken, Microsoft Money, or other accounting software programs. Also, the present invention contemplates the option of having no human user intervention by supporting generation of DOCs via an automated software program or via data import/export utilizing the industry standard Open Financial eXchange (OFX) format and other similar data file standards and the like. A software program could generate pre-scheduled DOC payments with information stored in a payment database or in an OFX file and once processed by the EPS the resulting DOC files are sent directly into the banking system for payroll or automated accounts payable type business scenarios.

The present invention also contemplates the world-wide usage of DOCs with auto-conversion and translation features of a world-wide ready paperless check. Because a DOC is created electronically, such as on the Internet, it is ready to be sent anywhere and instantly convertible into local language and currency. DOCs can use digital technologies such as Unicode character strings, UMT for universal time tracking, human language translation software services, client side computer "locale" settings and currency settings such that the DOC can be displayed in any local language and currency (given a set of conversion translators—USD to local currency exchange rate plus English to local language translator). While the display is local, the metadata in the computer system is continuously kept in English (or original language) and a complete audit trail/history of where the check went is kept including the current status, language, amount/value tracking on a worldwide basis. This makes DOCs a universal check format, for example a DOC can be issued in Yen and written in Japanese and yet it can be received by a payee in English Pounds and English text. The conversion happens on the fly to the original DOC drawn on the original bank. The DOC can be re-created and drawn on a different bank when used in international money transfer scenarios. The original US created DOC is deposited into a foreign bank which then requests that the EPS should generate a new local DOC that is drawn on itself and presented/endorsed to the original payee (electronically or in printed locally on their paper std) using local standards.

In another exemplary embodiment of the present invention, DOCs could be used as letters of credit (LOC) or other types of UCC drafts. Because DOCs are digital instructions to pay, these instructions can be used for letters of credit (another type of UCC draft) or Money Orders, as well as for checks. One of the options when creating the "instructions to pay" is to create a check, or money order, or "letter of credit". The EPS 66 can include a set of escrow conditions or requirements before paying when a LOC is selected and secured by some assets. The LOC feature also ties into the "world wide" ready invention features of the DOC EPS methods which facilitate the use of DOC for International payment transfers. The DOC world-wide ready inventions include features such as check metadata translation into alternative human languages, automatic multi-currency conversion at set or dynamic exchange rates, as well as utilization of local language and presentment features or requirements dictated by the payee or depositing institution which are described herein. All of these features make the DOC a valuable method of offering and securing letters of credit utilized in international business payments and value transfer mechanisms and methods.

In another exemplary embodiment of the present invention, a DOC can possess optional "control" metadata including a contract governing acceptance, escrow holding and release conditions which can also utilize shipment or delivery confirmation before releasing the payment, or attaching additional data to the payment including invoices, shipment instructions or return authorization mechanisms. Note that some of these conditional or contract features are enabled because each DOC payment can contain a clock state which monitors the status of the payment (issued, accepted, cleared or settled) which allows the EPS clearing and settlement method to either accepts or reject the processing of the DOC. These "clocks on DOCs" allow both real time tracking as well as contract enforcement such as "not valid after 1 hour", must be settled within 24 hours (to minimize currency exchange risk) or item must be received within 2 days (for releasing a payment conditional on receipt of an overnight FedEx type package).

In another exemplary embodiment of the present invention, additional per item security features can be provided to DOCs that are not facilitated currently on traditional paper checks. Examples of this include a private PIN number (ex. a 6 digit numeric code) per DOC item which can be sent by the EPS to the payee or by the payor to the payee using alternative delivery methods such as an in person meeting verbally transferring the PIN number from the payor to the payee, a telephone conversation or voicemail, an electronic notification including a FAX, an email, a text message or an Instant Message. This PIN number is required to be input by the payee before the EPS can release the payment to them as one of the conditions of the DOC payment. Additional security can be provided on DOCs including secure digital hashes and signatures (using PKI) as well as barcodes with encoded transaction identifies for automated processing. Finally, having an automatic Positive Pay Database allows the payor to easily control the issuance and clearance of a DOC unlike paper checks where a manual "stop payment" method must be placed by calling the bank and hoping that the item has not cleared. Using a combinations of "clocks on DOCs" and a PPD, a payor can self verify if a hold or stop payment is feasible for a given payment, thus reducing bad check payment risks.

A Paper Originated Check (POC) covers the idea of a bank using its existing Item Processing department reader/sorter imaging equipment to capture an image of a paper check and using OCR, create the required DOC metadata in order to create the equivalent DPF record. Thus using existing processes, a paper scanning bank can leverage all of the benefits of a DOC and the EPS if they use their equipment to send DOC metadata to the EPS. The banks existing IBM 3890 and the like can be modified or extended with PC software to extract data from the paper oriented check (POC) via OCR and then create a DOC after the fact. This allows older banking systems to be integrated into the EPS to leverage the full benefits of Check 21 along with the unique DOC features. Creating a DOC from a scanned paper check requires OCR and validation of amount, identifying payee, and using OCR of MICR line data to identify payor. The actual image can ride along in the DOC file, but the main point is to create from scanned paper the "digital instructions to pay" concept that is the core of what a DOC really is. Once in DOC format, all of the other benefits accrue to the bank. Issues with POC to DOC may include additional human intervention to verify OCR data or error checking. Once the EPS posses the OCR data in the DPF, it can regenerate a new check image with better image quality (less noise, no skew, etc) than the paper scanned image originally contained.

Another exemplary embodiment of the present invention demonstrates the enhanced IRD capability that is facilitated by DOCs and EPS. When IRDs are created by a remote, high volume IRD printing facility, they could be printed onto special IRD paper stock that includes a magnetic stripe. The stripe would be used to encode all of the DOC metadata, including GUID, amount, date, payee, etc. Scanning the stripe and sending the resulting data into the EPS allows for automated IRD processing for banks. This idea is similar to the airline boarding passes that have stripes for automated clearing during the passenger boarding process.

Another exemplary embodiment of the present invention demonstrates enhanced security that DOCs and EPS can provide to IRD processing and cashing. This feature set can be known as enhanced security methods for IRD including, anti-counterfeit features, and enhanced verification methods which prevent rogue or double deposits. Using the existing Check 21 IRD specification, the EPS is allowed to extend the format (there is room for optional parts) where the EPS can add new concepts onto an IRD such as: instructions to call 1-800-che-ckme for the customer or teller to call for IRD self-service verification, a barcode on the check (PDF 417, or United States Postal Service—USPS) to "pull" the check back into the BOFD, or security hashes, or other ID verification data on the sender or receiver. Note that the 800 # verification could be tied to a strong "brand name" of existing check issuers allowing for higher customer awareness and trust for who issued the IRD—examples of known check issuers include Deluxe or Harland, thus avoiding IRDs which could be easily spoofed with Joe's ACME IRD branded concept. EPS member banks can subscribe to the 800 check-me service and using phone touch tones punch in their account number and code, followed by the DOC IRD GUID value. The EPS uses this information to first validate that the bank is real and then second to lookup the DOC in the DPF. Then, the interactive voice response (IVR) service of the EPS tells the user that the DOC IRD is real and optionally who the payee should be (a secondary validation feature of this 800 # service). The barcode can be used to automate this process—just scan it and a bank teller could avoid the IVR touch tone data entry step. Or the bank teller could use a website to enter in the GUID or Tx ID and verify the IRD. In order to try and spoof the system and negotiate or cash a DOC a thief would have to be able to generate a valid Globally Unique Identifier (GUID) or secure DOC Transaction ID and check number. Given the inputs to these algorithms, it is hard for external counterfeiters to reproduce them and create fake DOCs which they would try to deposit. Thus, the EPS security and verification methods can eliminate the fake IRD problem. This condition, as contemplated by the industry, is one where any moderately skilled digital graphics editor or Photoshop user edits an existing standard (i.e. non-DOC) IRD image in order to make it payable to themselves. The existing Check 21 IRD idea is weak because hackers with Photoshop can create a valid Check 21 image. DOCs do not have this Check 21 weakness via this IRD security method. The GUID or Tx ID would be used to verify an IRD before it would be accepted for deposit. This method would be used along with the 1-800-Che-ckme phone verification service. Because the IRDs are enhanced paper items which contain 2D barcodes as well as instructions for calling a 1-800 number for verification, the EPS can reduce the likelihood of errors or fraud at the Bank of First Deposit (BOFD). That is, using the DOC and EPS methods, a BOFD can have greater confidence that the EPS IRDs are legitimate when they use electronic verification methods (1 800 che-ckme phone number to call an IVR system) to verify DOCs. This feature reduces liability by giving the BOFD enhanced confidence when receiving a DOC/IRD as opposed to conventional Check 21 items. The EPS allows for a greater audit trail and a clear liability chain of custody to be presented/inspected and known at all times, thus increasing check confidence.

Another exemplary embodiment of the present invention demonstrates the concept of IRD generation not from a paper item but from a DOC metadata via the EPS. A DOC can be printed to create an IRD or a paper check. The digital check image and DOC metadata are being applied to the IRD layout and X9.140 specification to create a valid Check21 item. Traditionally or by convention, an IRD was only created by scanning a paper check, this item covers the translation or transformation of the DOC metadata and image to the IRD format (different than a scanner doing it) The EPS does not scan a paper item to create an IRD, DOCS have a metadata driven IRD.

Figure 10:
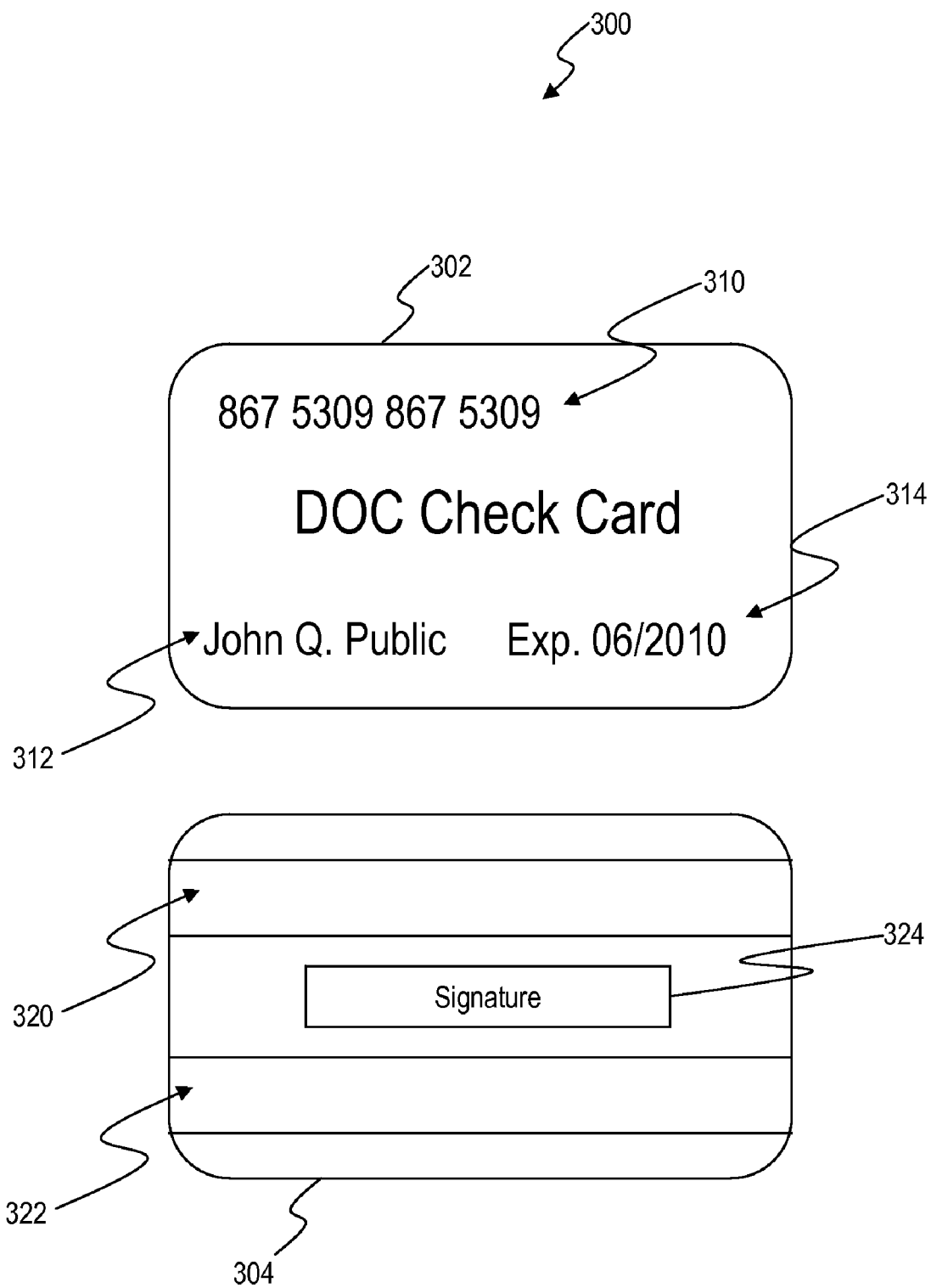
FIG. 10 is a diagram of a True Check Card according to an exemplary embodiment of the present invention.

Referring to FIG. 10, a true check card 300 is illustrated showing a card front 302 and back 304 according to an exemplary embodiment of the present invention. As described herein, the check card 300 can be utilized at POS terminals to automatically create DOCs which are processed under the mechanisms described herein under Check 21. Advantageously, this offers consumers a true check card, and not an ACH-based or other debit-based card. The card front 302 includes an account number 310, a cardholder's name 312, and an expiration date 314. The card back 304 includes two magnetic strips 320, 322 and a signature block 324. The two magnetic strips 320, 322 include data which is received at a POS terminal responsive to swiping the card 300. Here, one of the strips 320,322 can include metadata associated with creating a DOC, and the other can include standard data from an ATM card or Credit Card. Specifically, the card 300 can provide dual-services, i.e. a DOC check card and an ATM card or Credit Card. Optionally, the card 302,304 can include a UPC code or PDF417 barcode for alternative "swipe" methods to generate the DOC for non-swipe but scanning enabled POS terminal devices.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A paperless check method, comprising:
    authenticating a payor through an electronic payment system comprising a network connection to the payor;
    receiving a payment instruction from the payor to a payee, wherein the payment instruction includes an instruction to debit a bank account of the payor;
    creating a check comprising metadata containing the payment instruction, a globally unique identifier, tracking information, and security information, wherein the check is created electronically without an original paper check, and wherein the globally unique identifier, tracking information, and security information comprise a mechanism to transfer risk associated with the check similar to risk transference mechanisms associated with the original paper check;
    electronically notifying the payee of the check;
    verifying the check in the electronic payment system using the globally unique identifier prior to depositing or cashing the check; and
    clearing the check with one of paper and electronic clearing methods associated with check clearing systems.

2. The paperless check method of claim 1, further comprising:
    authenticating the payee through the electronic payment system comprising a network connection to the payee;
    providing a check image from the metadata to the payee; and
    printing a substitute check from the metadata, wherein the substitute check is printed with zero degrees of skew and with substantially no stray noise.

3. The paperless check method of claim 1, further comprising:
    authenticating the payee through the electronic payment system comprising a network connection to the payee;
    providing a check image from the metadata to the payee;
    creating an image cash letter file from the metadata, wherein the image cash letter file is created with zero degrees of skew and with substantially no stray noise; and
    electronically forwarding the image cash letter file to a deposit bank responsive to instructions from the payee.

4. The paperless check method of claim 1, wherein the security information is operable to prevent tampering with the payment instructions, the check, and the metadata.

5. The paperless check method of claim 1, further comprising:
   authenticating the payee through the electronic payment system comprising a network connection to the payee;
   providing a check image from the metadata to the payee; and
   electronically endorsing the check, wherein the electronic endorsement is stored in the metadata, and wherein a check image is created with the endorsement to avoid overlapping images.

6. The paperless check method of claim 1, wherein the payment instructions comprise any of conditions, limitations, restrictions, and conditional acknowledgements comprising business rules governing payment terms.

7. The paperless check method of claim 1, further comprising:
   authenticating one of the payor and the payee through the electronic payment system; and
   providing an audit history to the one of the payor and the payee responsive to the tracking information, wherein the tracking information is updated responsive to events associated with the check.

8. The paperless check method of claim 1, further comprising:
   authenticating the payee with a personal identification number defined by the payor.

9. A paperless check system, comprising:
   a network interface connected to a network and operable to communicate to a plurality of payors, payees, and banks;
   a data storage connected to the network storage;
   a processor connected to the network interface and the data storage, wherein the processor is configured to:
   authenticate a payor through the network interface;
   receive a payment instruction from the payor to a payee, wherein the payment instruction includes an instruction to debit a bank account of the payor;
   create a check comprising metadata containing the payment instruction, a globally unique identifier, tracking information, and security information, wherein the check is created electronically without an original paper check, and wherein the globally unique identifier, tracking information, and security information comprise a mechanism to transfer risk associated with the check similar to risk transference mechanisms associated with the original paper check;
   store the check in the data storage;
   electronically notify the payee of the check through the network interface;
   verify the check using the globally unique identifier prior to depositing or cashing the check; and
   clear the check with one of paper and electronic clearing methods associated with check clearing systems.

10. The paperless check system of claim 9, wherein the processor is further configured to:
    authenticate the payee through the network interface;
    provide a check image from the metadata to the payee over the network interface; and
    print a substitute check from the metadata, wherein the substitute check is printed with zero degrees of skew and with substantially no stray noise.

11. The paperless check system of claim 9, wherein the processor is further configured to:
    authenticate the payee through the network interface;
    provide a check image from the metadata to the payee over the network interface;
    create an image cash letter file from the metadata, wherein the image cash letter file is created with zero degrees of skew and with substantially no stray noise; and
    electronically forward the image cash letter file to a deposit bank responsive to instructions from the payee.

12. The paperless check system of claim 9, wherein the security information is operable to prevent tampering with the payment instructions, the check, and the metadata.

13. The paperless check system of claim 9, wherein the processor is further configured to:
    authenticate the payee through the network interface;
    provide a check image from the metadata to the payee over the network interface;
    electronically endorse the check, wherein the electronic endorsement is stored in the metadata, and wherein a check image is created with the endorsement to avoid overlapping images.

14. The paperless check system of claim 9, wherein the payment instructions comprise any of conditions, limitations, restrictions, and conditional acknowledgements comprising business rules governing payment terms.

15. The paperless check system of claim 9, wherein the processor is further configured to:
    authenticate one of the payor and the payee through the electronic payment system; and
    provide an audit history to the one of the payor and the payee responsive to the tracking information, wherein the tracking information is updated responsive to events associated with the check.

* * * * *